(12) United States Patent
Adachi et al.

(10) Patent No.: US 11,493,038 B2
(45) Date of Patent: Nov. 8, 2022

(54) CRANKSHAFT, METHOD OF ASSEMBLING THE CRANKSHAFT, ROTARY COMPRESSOR AND REFRIGERATION-CYCLE DEVICE

(71) Applicant: Kabushiki Kaisha Toshiba, Minato-ku (JP)

(72) Inventors: Kosuke Adachi, Yokohama (JP); Kuniaki Yamamoto, Yokohama (JP); Takayuki Masunaga, Yokohama (JP); Shogo Shida, Fuji (JP)

(73) Assignee: Kabushiki Kaislia Toshiba, Minato-ku (JP)

( * ) Notice: Subject to any disclaimer, the term of this patent is extended or adjusted under 35 U.S.C. 154(b) by 509 days.

(21) Appl. No.: 16/729,585

(22) Filed: Dec. 30, 2019

(65) Prior Publication Data

US 2020/0132071 A1    Apr. 30, 2020

Related U.S. Application Data

(63) Continuation of application No. PCT/JP2019/009193, filed on Mar. 7, 2019.

(30) Foreign Application Priority Data

May 31, 2018    (JP) .............................. JP2018-104964

(51) Int. Cl.
  *F16C 3/12*  (2006.01)
  *F16C 3/04*  (2006.01)
  (Continued)

(52) U.S. Cl.
  CPC ............ *F04C 15/0057* (2013.01); *F16C 3/12* (2013.01); *F04C 2240/60* (2013.01); *F16C 2226/60* (2013.01); *F16C 2360/00* (2013.01)

(58) Field of Classification Search
  CPC .......... F16C 3/12; F16C 3/04; F04C 15/0057; F04C 15/0076; F04C 18/3564;
  (Continued)

(56) References Cited

U.S. PATENT DOCUMENTS 1,908,071 A * 5/1933 Snyder ...................... F16C 3/12
                                                                74/598
3,042,433 A * 7/1962 Koen ...................... F16B 2/065
                                                                403/19

(Continued)

FOREIGN PATENT DOCUMENTS

JP    59-114484 U    8/1984
JP    02-126083 U    10/1990
  (Continued)

OTHER PUBLICATIONS

International Search Report dated Jun. 11, 2019 in PCT/JP2019/009193 filed on Mar. 7, 2019, 2 pages.

*Primary Examiner* — Deming Wan
(74) *Attorney, Agent, or Firm* — Oblon, McClelland, Maier & Neustadt, L.L.P.

(57) ABSTRACT

According to one embodiment, a crank portion is formed from a crank piece, an element separate from a shaft portion. The crank piece includes a fitting hole in which the shaft portion is fit by predetermined "interference" and a slit-like slot with one end opened in an inner circumferential surface of the fitting hole, and an other end closed inside the crank piece. The fitting hole is deformed so as to expand its diameter when expanding a width of the slot. The shaft portion is fit in the fitting hole of the crank piece by the predetermined "interference" when inserted in the deformed fitting hole and the fitting hole restores an original form while the shaft portion is in the fitting hole.

14 Claims, 14 Drawing Sheets

(51) Int. Cl.
*F04C 15/00* (2006.01)
*F04C 18/356* (2006.01)

(58) Field of Classification Search
CPC ...... F04C 29/0078; F16B 2/065; F16B 21/16; F16B 21/18; F16B 21/186
See application file for complete search history.

(56) References Cited

U.S. PATENT DOCUMENTS

| | | | | |
|---|---|---|---|---|
| 4,185,839 A | * | 1/1980 | Allen | F04C 2/1073 277/520 |
| 4,262,420 A | * | 4/1981 | Nalley | B23D 49/162 30/392 |
| 4,492,127 A | * | 1/1985 | Kuhn | F04B 35/04 417/415 |
| 4,621,994 A | * | 11/1986 | Ellis | F04C 15/0076 418/206.1 |
| 5,575,173 A | * | 11/1996 | Brackett | F16H 21/36 92/138 |
| 5,679,991 A | * | 10/1997 | Wolf | B26B 19/28 310/80 |
| 2015/0300402 A1 | * | 10/2015 | Wilhelm | F16C 3/12 74/598 |
| 2016/0018136 A1 | | 1/2016 | Hirayama et al. | |

FOREIGN PATENT DOCUMENTS

| | | |
|---|---|---|
| JP | 06-026478 A | 2/1994 |
| JP | 09-089077 A | 3/1997 |
| JP | 4594302 B2 | 12/2010 |
| JP | 2014-190175 A | 10/2014 |
| JP | 6077352 B2 | 2/2017 |

\* cited by examiner

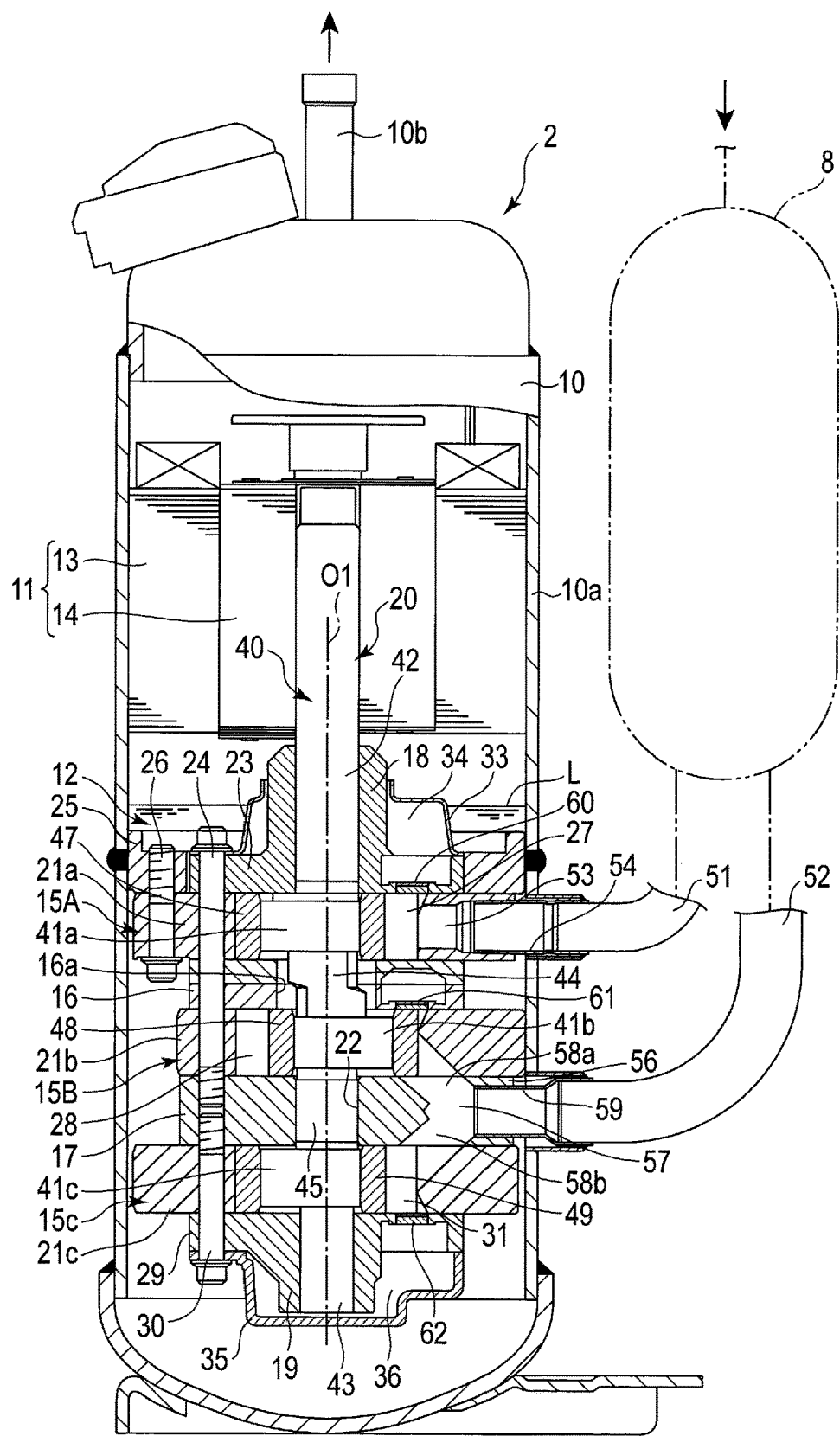
F I G. 2

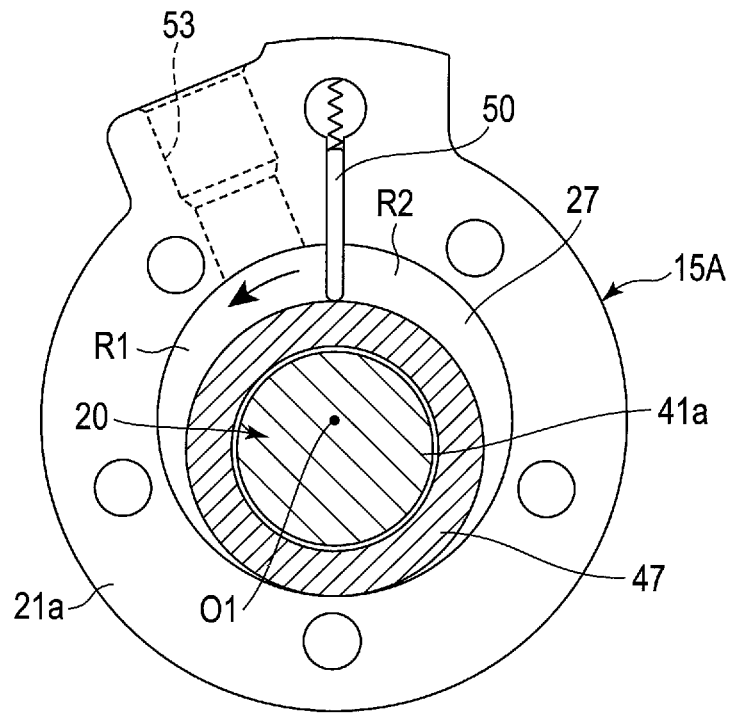
F I G. 3
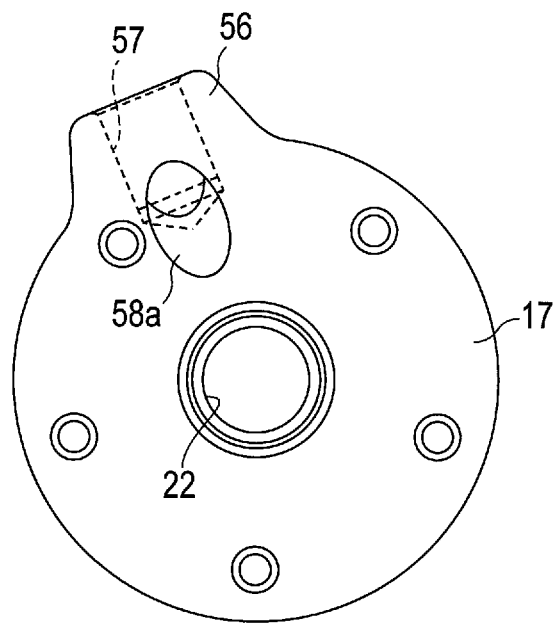
F I G. 4

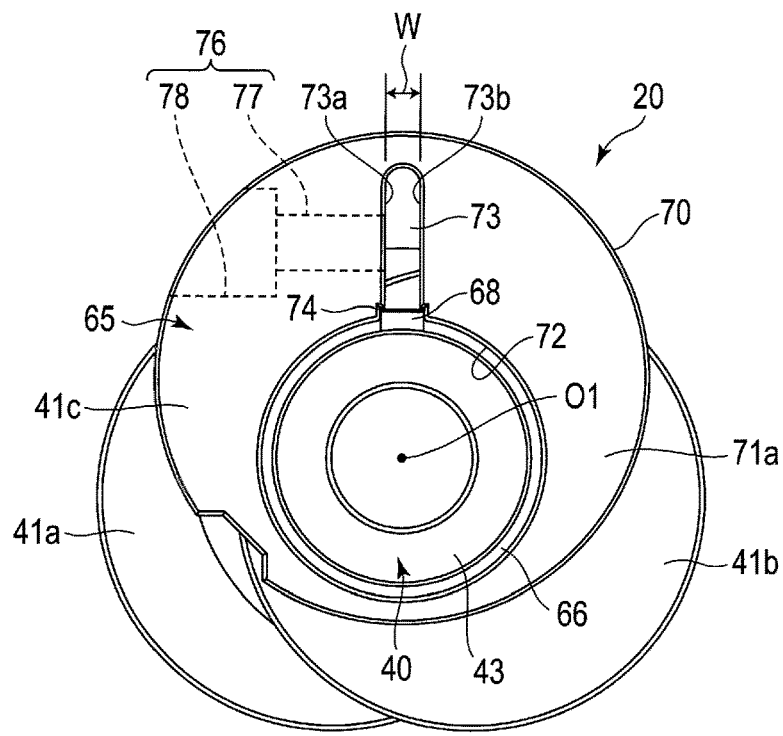
F I G. 8
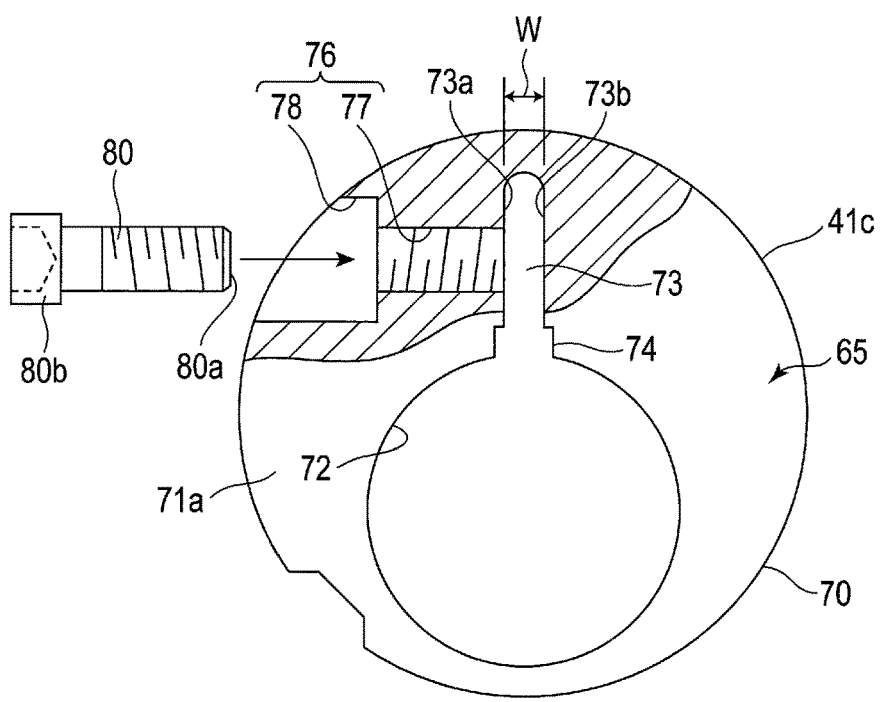
F I G. 9

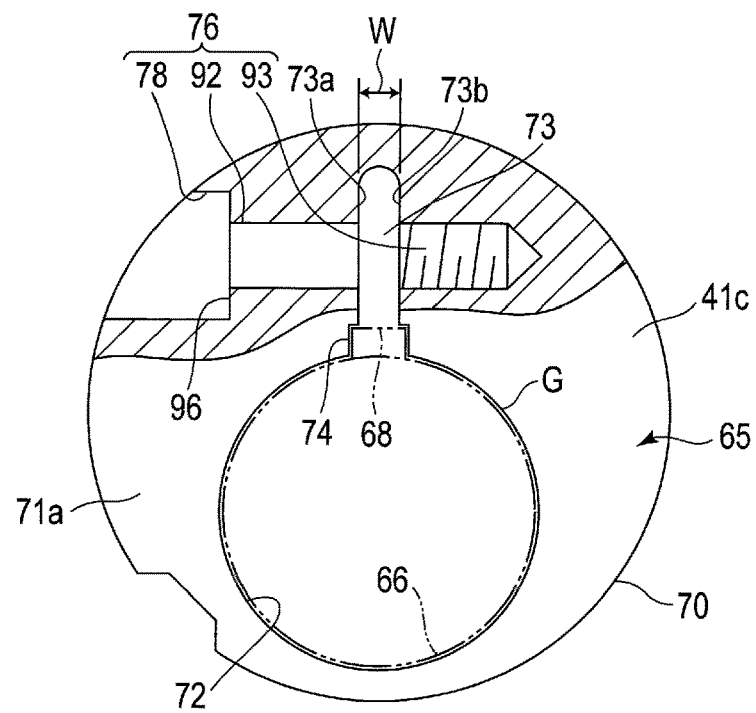
F I G. 14
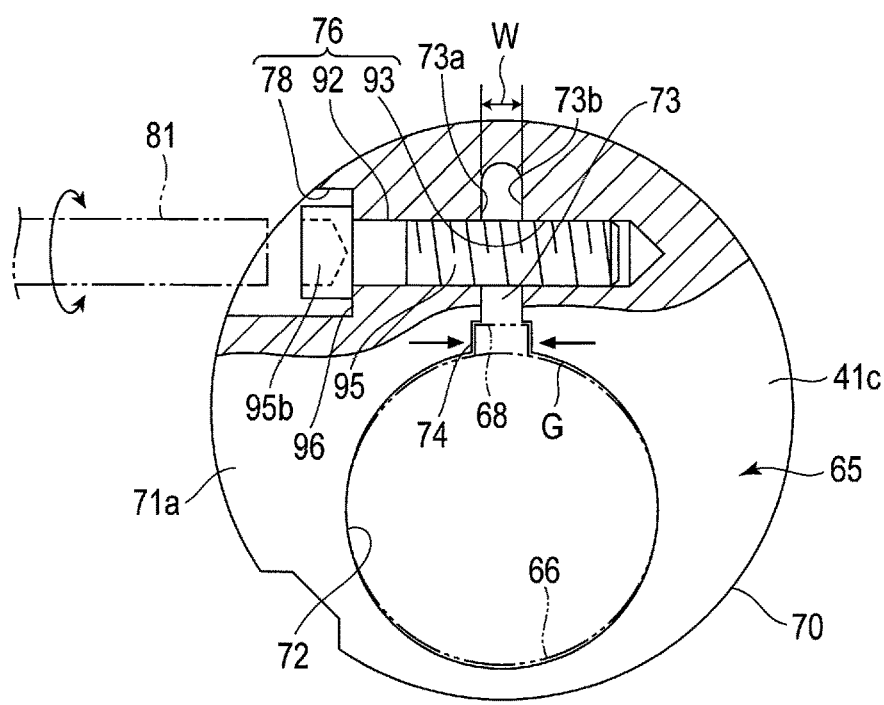
F I G. 15

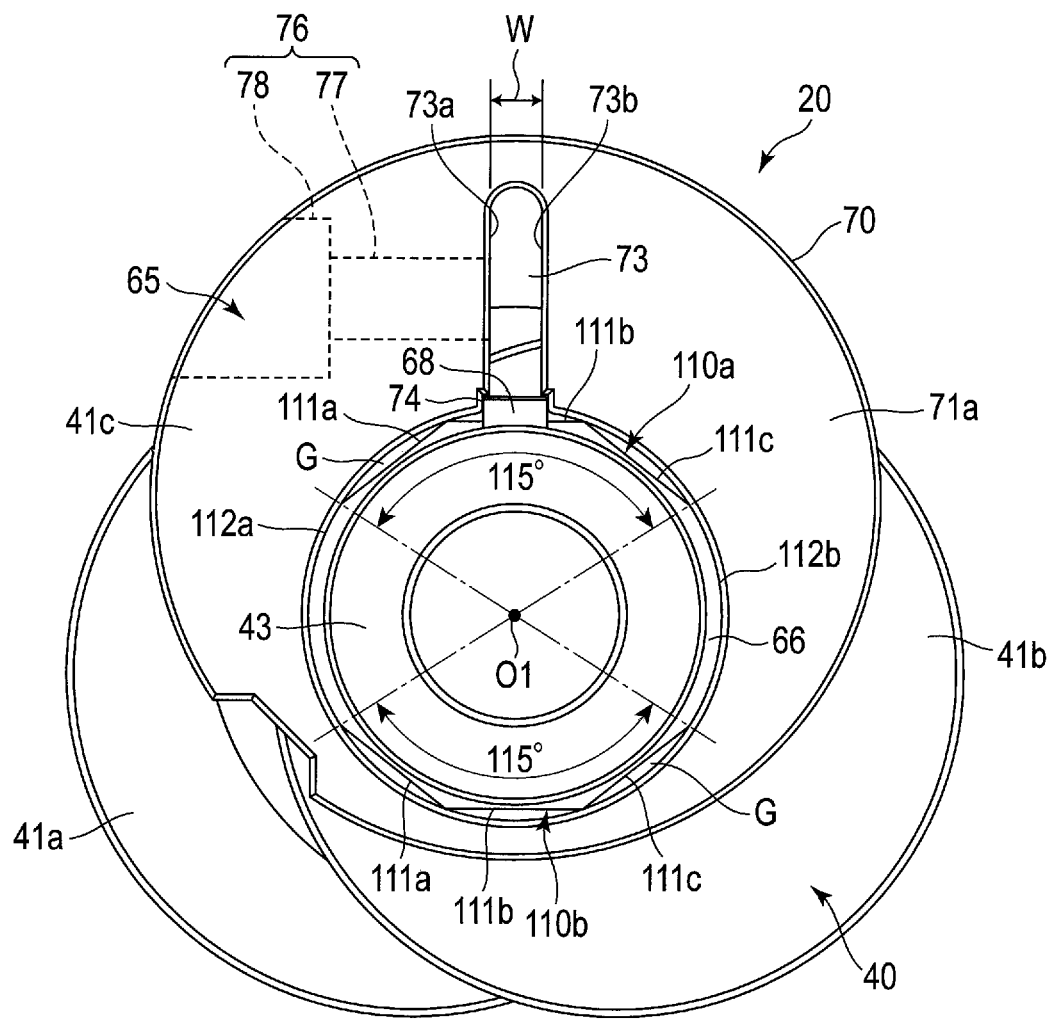
F I G. 19

US 11,493,038 B2

CRANKSHAFT, METHOD OF ASSEMBLING THE CRANKSHAFT, ROTARY COMPRESSOR AND REFRIGERATION-CYCLE DEVICE

CROSS-REFERENCE TO RELATED APPLICATIONS

This application is a Continuation Application of PCT Application No. PCT/JP2019/009193, filed Mar. 7, 2019 and based upon and claiming the benefit of priority from Japanese Patent Application No. 2018-104964, filed May 31, 2018, the entire contents of all of which are incorporated herein by reference.

FIELD

Embodiments described herein relate generally to a crankshaft comprising a crank portion, and a method of assembling the crankshaft, and further a rotary compressor comprising the crankshaft and a refrigeration-cycle device comprising the rotary compressor.

BACKGROUND

In recent years, 3-cylinder rotary compressors comprising three sets of coolant compressing portions, designed to enhance the coolant-compressing capacity have been developed. The crankshaft to be employed in this sort of rotary compressor comprises a straight shaft portion and three crank portions arranged at intervals along the axial direction of the shaft portion and eccentrically rotating within the cylinder chamber of the coolant compressing unit.

Here, the crank portion of the crankshaft is set eccentric with respect to the rotation center of the shaft portion. Therefore, if the shaft portion and the three crank portions are formed by molding all in one body, it is necessary to shift the position of the rotation center of the crankshaft each time the shaft portion and the crank portions are subjected to grinding process, for example, using an engine lathe. For this reason, the number of operation steps increases, which lead to an increase in the manufacturing cost of the crankshaft.

On the other hand, a divided type crankshaft is known, in which at least one crank portion is constituted from a crank piece different from that of the shaft portion and the crank piece finished to have a predetermined size is built in the shaft portion. The crank piece to be built in the shaft portion is formed to have a fitting hole with the shaft portion is fit, and is fixed to the shaft portion using a key.

The divided type crankshaft, in which the shaft portion and the crank piece are fixed by a key can be prepared by a less number of processing steps as compared to the case of the integrated one-body crankshaft, and thus it is advantageous in terms of cost.

However, due to the accuracy of the key, the shaft portions, and the crank piece, a gap may be created between the key and the shaft portion or between the key and the crank piece, which makes it difficult to fully secure the fixation strength of the crank piece to the shaft portion.

As a result, during operation of the rotary compressor, rattling of the crank piece cannot be avoided. The crankshaft with rattling crank peace adversely affects the compression performance of the coolant, and also becomes one factor which promotes noise and vibration of the rotary compressor.

An object of the embodiment is to obtain a crankshaft in which the operation of fixing the crank piece to the crank piece can be easily done, the fixation strength of the crank piece to the shaft portion can be fully secured, and further, the crank piece can be removable.

BRIEF DESCRIPTION OF THE DRAWINGS

FIG. 2 is a cross section of a 3-cylinder rotary compressor according to the first embodiment.

FIG. 3 is a cross section of a first coolant compression section, schematically showing locations of a roller and a vane with respect to each other, which eccentrically rotate within a first cylinder chamber in the first embodiment.

FIG. 4 is a plan view of a second intermediate partition plate used in the first embodiment.

FIG. 8 is a front view of the crankshaft viewed from a direction of an arrow A in FIG. 5.

FIG. 9 is a front view showing a part of the crank piece of the first embodiment in cross section.

FIG. 14 is a front view showing a part of the crank piece of the third embodiment in cross section.

FIG. 15 is a front view of the crank piece, showing partially a cross section thereof, in a state where the width of a slot is narrowed with a tightening bolt, in the third embodiment.

FIG. 19 is a front view of the crankshaft of the fifth embodiment as viewed from an axial direction.

DETAILED DESCRIPTION

In general, according to one embodiment, a crankshaft comprises a shaft portion comprising a straight axial line, and at least one crank portion provided in the shaft portion so as to be eccentric to the axial line of the shaft portion. The at least one crank portion is formed from a crank piece, which is an element separate from the shaft portion. The crank piece includes a fitting hole in which the shaft portion is fit by predetermined "interference" and a slit-like slot one end of which is opened in an inner circumferential surface of the fitting hole, and an other end of which extends along a diametric direction of the fitting hole so as to be closed inside the crank piece. The slot is opened in both end surfaces of the crank piece. The fitting hole is deformed so as to expand a diameter of the fitting hole when expanding a width of the slot. The shaft portion is fit in the fitting hole of the crank piece by the predetermined "interference" when the shaft portion is inserted in the deformed fitting hole and the fitting hole restores an original form while the shaft portion is in the fitting hole.

First Embodiment

Hereafter, the first embodiment will now be described with reference to FIGS. 1 to 10.

Figure 1:
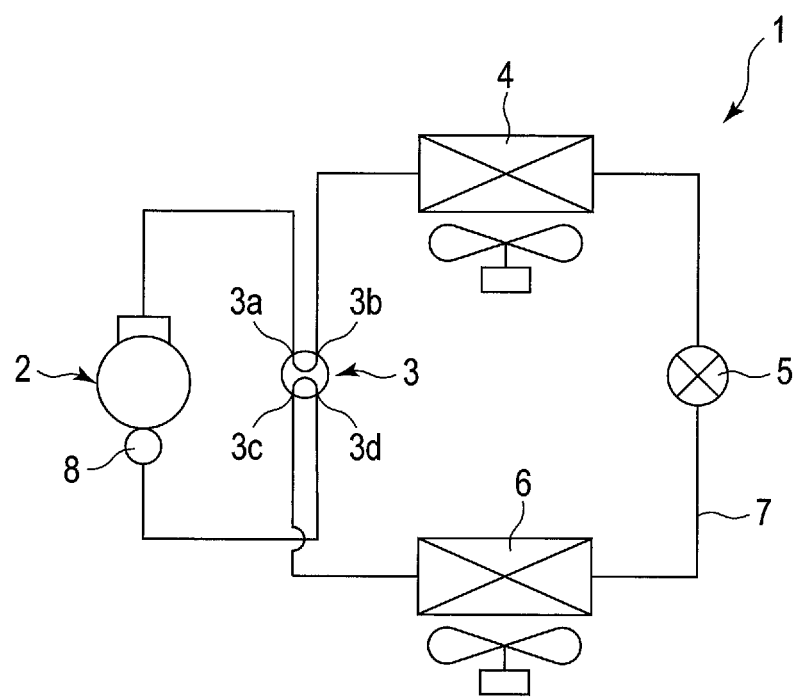
FIG. 1 is a circuit diagram schematically showing a structure of a refrigeration-cycle device according to the first embodiment.

FIG. 1 is a circuit diagram of a refrigeration cycle of an air conditioner 1, which is an example of the refrigeration-cycle device. The air conditioner 1 comprises a rotary compressor 2, a four-way valve 3, an outdoor heat exchanger 4, an expansion device 5 and an indoor heat exchanger 6 as main elements. These elements which constitute the air conditioner 1 are connected each other via a circulation circuit 7 in which a coolant circulates.

More specifically, as shown in FIG. 1, a discharge side of the rotary compressor 2 is connected to a first port 3a of the four-way valve 3. A second port 3b of the four-way valve 3 is connected to the outdoor heat exchanger 4. The outdoor heat exchanger 4 is connected to the indoor heat exchanger 6 via an expansion device 5. The indoor heat exchanger 6 is connected to a third port 3c of the four-way valve 3. A fourth port 3d of the four-way valve 3 is connected to a suction side of the rotary compressor 2 via an accumulator 8.

When the air conditioner 1 is driven in a cooling mode, the four-way valve 3 operates to connect the first port 3a to the second port 3b and the third port 3c to the fourth port 3d. If the operation of the air conditioner 1 is started by the cooling mode, a high-temperature and high-pressure gaseous coolant compressed by the rotary compressor 2 is guided to the outdoor heat exchanger 4 which functions as a heat radiator (condenser) via the four-way valve 3.

The gaseous coolant guided to the outdoor heat exchanger 4 is condensed by heat exchange with air, and transformed into to a high-pressure liquid-phase coolant. The high-pressure liquid-phase coolant is decompressed in the process of being passed through the expansion device 5 to be transformed into a low-pressure gas-liquid two-phase coolant. The gas-liquid two-phase coolant is guided to the indoor heat exchanger 6, which functions as a heat sink (evaporator), and subjected to heat exchange with air in the process of being passed through the indoor heat exchanger 6.

As a result, the gas-liquid two-phase coolant absorbs heat from the air to evaporate, and transforms into a low-temperature and low-pressure gaseous coolant. The air passing through the indoor heat exchanger 6 is cooled by the latent heat of vaporization of the liquid-phase coolant to become cool air and sent to the place to be air-conditioned (cooled).

The low-temperature and low-pressure gaseous coolant which passed the indoor heat exchanger 6 is guided to the accumulator 8 via the four-way valve 3. When the liquid-phase coolant which remains unevaporated is mixed in the coolant, it is separated by the accumulator 8 into a liquid-phase coolant and a gaseous coolant. The low-temperature and low-pressure gaseous coolant from which the liquid-phase coolant has been separated is suctioned into the rotary compressor 2, and also compressed again into a high-temperature and high-pressure gaseous coolant by the rotary compressor 2, to be then discharged to the circulation circuit 7.

On the other hand, when the air conditioner 1 is driven in heating mode, the four-way valve 3 is switched to connect the first port 3a to the third port 3c and the second port 3b to the fourth port 3d. Thus, a high-temperature and high-pressure gaseous coolant discharged from the rotary compressor 2 is guided to the indoor heat exchanger 6 via the four-way valve 3, and subjected to heat exchange with the air passing through the indoor heat exchanger 6. That is, the indoor heat exchanger 6 functions as a condenser.

As a result, the gaseous coolant which passes the indoor heat exchanger 6 is condensed by heat exchange with air, and transforms into a high-pressure liquid-phase coolant. The air which passes the indoor heat exchanger 6 is heated by heat exchange with the gaseous coolant to become warm air, and is sent to the place to be air-conditioned (heated).

The high-pressure liquid-phase coolant which has passed the indoor heat exchanger 6 is guided to the expansion device 5 and also decompressed in the process of being passed through the expansion device 5, thus being transformed into a low-pressure gas-liquid two-phase coolant. The gas-liquid two-phase coolant is guided to the outdoor heat exchanger 4, which functions as an evaporator, where it is evaporated by heat exchange with air, and transformed into a low-temperature and low-pressure gaseous coolant. The low-temperature and low-pressure gaseous coolant which has passed the outdoor heat exchanger 4 is suctioned into the rotary compressor 2 via the four-way valve 3 and the accumulator 8.

Next, the concrete structure of the rotary compressor 2 used in the air conditioner 1 will be described with reference to FIGS. 2 to 6. FIG. 2 is a cross section of the vertical-type 3-cylinder rotary compressor 2. As shown in FIG. 2, the 3-cylinder rotary compressor 2 comprises an airtight container 10, an electric motor 11 and a compression mechanism 12 as main elements.

The airtight container 10 comprises a cylindrical circumferential wall 10a and is set to stand up along the perpendicular direction. An outlet pipe 10b is provided in an upper end portion of the airtight container 10. The outlet pipe 10b is connected to the first port 3a of the four-way valve 3 via the circulation circuit V. Further, lubricating oil to lubricate the compression mechanism 12 is accumulated in a lower portion of the airtight container 10.

The electric motor 11 is accommodated in an axial middle portion of the airtight container 10. The electric motor 11 is of the so-called inner rotor type, and comprises a stator 13 and a rotor 14. The stator 13 is fixed to an inner surface of the circumferential wall 10a of the airtight container 10. The rotor 14 is surrounded by the stator 13.

The compression mechanism 12 is accommodated in a lower portion of the airtight container 10 so as to be immersed in the lubricating oil. The compression mechanism 12 comprises a first coolant compression unit 15A, a second coolant compression unit 15B, a third coolant compression unit 15C, a first intermediate partition plate 16, a second intermediate partition plate 17, a first bearing 18, a second bearing 19 and a crankshaft 20 as main elements.

The first to third coolant compression units 15A, 15B and 15C are arranged in line along the axial direction of the airtight container 10 with intervals therebetween. The first to third coolant compression units 15A, 15B and 15C comprise a first cylinder body 21a, a second cylinder body 21b and a third cylinder body 21c, respectively. The first to third cylinder bodies 21a, 21b and 21c are formed to have substantially a thickness dimension along the axial direction of the airtight container 10.

The first intermediate partition plate 16 is interposed between the first cylinder body 21a and the second cylinder body 21b. An upper surface of the first intermediate partition plate 16 is stacked on a lower surface of the first cylinder body 21a so as to cover an inner diameter portion of the first cylinder body 21a from an lower side. A lower surface of the first intermediate partition plate 16 is stacked on an upper surface of the second cylinder body 21b so as to cover an inner diameter portion of the second cylinder body 21b from an upper side.

Further, a through-hole 16a is formed in a central portion of the first intermediate partition plate 16. The through-hole 16a is located between the inner diameter portion of the first cylinder body 21a and the inner diameter portion of the second cylinder body 21b.

The second intermediate partition plate 17 is interposed between the second cylinder body 21b and the third cylinder body 21c. An upper surface of the second intermediate partition plate 17 is stacked on a lower surface of the second cylinder body 21b so as to cover an inner diameter portion of the second cylinder body 21b from a lower side. A lower surface of the second intermediate partition plate 17 is stacked on an upper surface of the third cylinder body 21c so as to cover an inner diameter portion of the third cylinder body 21c from an upper side.

A bearing hole 22 is formed in a central portion of the second intermediate partition plate 17. As shown in FIG. 4, the bearing hole 22 has a circular aperture shape and is located between the inner diameter portion of the second cylinder body 21b and the inner diameter portion of the third cylinder body 21c.

The first bearing 18 is disposed on the first cylinder body 21a. The first bearing 18 includes a flange portion 23 projecting towards the circumferential wall 10a of the airtight container 10. The flange portion 23 is stacked on the upper surface of the first cylinder body 21a so as to cover the inner diameter portion of the first cylinder body 21a from an upper side.

The flange portion 23 of the first bearing 18, the first cylinder body 21a, the first intermediate partition plate 16, the second cylinder body 21b and the second intermediate partition plate 17 are stacked on one another along the axial direction of the airtight container 10, and are combined in one integral body with a plurality of first fastening bolts 24 (only one of them is shown).

According to this embodiment, the flange portion 23 of the first bearing 18 is surrounded by a ring-like support member 25. The support member 25 is fixed to the inner surface of the circumferential wall 10a of the airtight container 10 by way of welding or the like. An outer peripheral portion of the first cylinder body 21a is joined to a lower surface of the support member 25 with a plurality of second fastening bolts 26 (only one of them is shown).

As shown in FIG. 2, the region surrounded by the inner diameter portion of the first cylinder body 21a, the first intermediate partition plate 16, and the flange portion 23 of the first bearing 18 defines a first cylinder chamber 27. Similarly, the region surrounded with the inner diameter portion of the second cylinder body 21b, the first intermediate partition plate 16, and the second intermediate partition plate 17 defines a second cylinder chamber 28.

The second bearing 19 is disposed between the third cylinder body 21c and the bottom of the airtight container 10. The second bearing 19 includes a flange portion 29 projected towards the circumferential wall 10a of the airtight container 10. The flange portion 29 is stacked on a lower surface of the third cylinder body 21c so as to cover an inner diameter portion of the third cylinder body 21c from a lower side.

The flange portion 29 of the second bearing 19, the third cylinder body 21c and the second intermediate partition plate 17 are stacked one on another in the axial direction of the airtight container 10 and jointed in one integral body with a plurality of third fastening bolts 30 (only one of them is shown).

The region surrounded by the inner diameter portion of the third cylinder body 21c, the second intermediate partition plate 17, and the flange portion 29 of the second bearing 19 defines a third cylinder chamber 31. Therefore, the first cylinder chamber 27, the second cylinder chamber 28 and the third cylinder chamber 31 are arranged along the axial direction of the airtight container 10 with intervals therebetween.

As shown in FIG. 2, a first outlet muffler 33 is attached to the first bearing 18. Between the first outlet muffler 33 and the first bearing 18, a first silencer chamber 34 is formed. The first silencer chamber 34 is opened to the inside of the airtight container 10 through an exhaust hole (not shown) of the first outlet muffler 33.

A second outlet muffler 35 is attached to the second bearing 19. Between the second outlet muffler 35 and the second bearing 19, a second silencer chamber 36 is formed.

Figure 5:
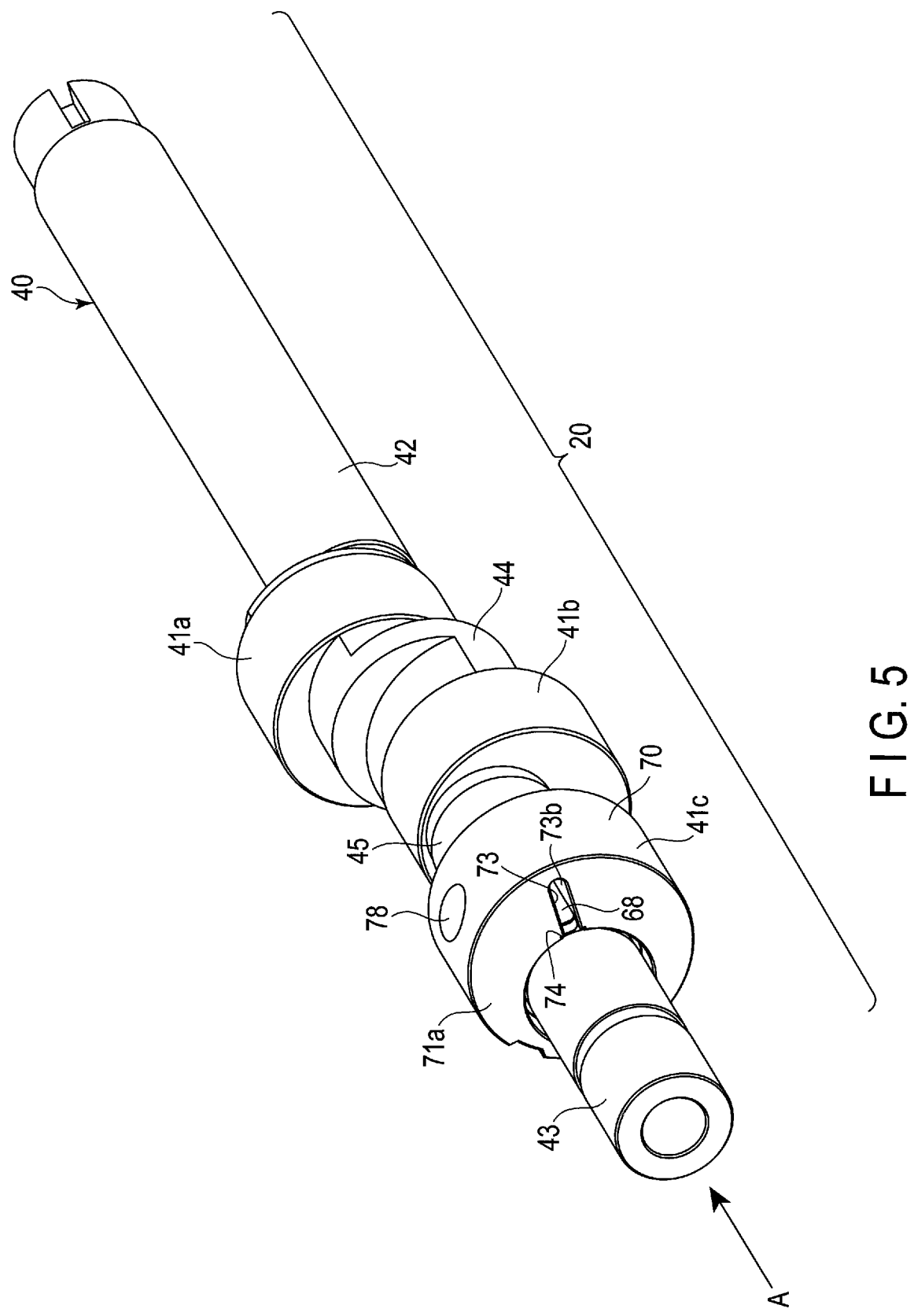
FIG. 5 is a perspective view of a crankshaft according to the first embodiment.

As shown in FIGS. 2 and 5, the crankshaft 20, as a revolving shaft, comprises a shaft portion 40 and first to third crank portions 41a, 41b and 41c as main elements. The shaft portion 40 extends linearly along the axial direction of the airtight container 10. The shaft portion 40 includes a first journal portion 42 located in an upper part of the shaft portion 40, a second journal portion 43 located in an lower end part of the shaft portion 40, a first intermediate shaft portion 44 and a second intermediate shaft portion 45, located between the first journal portion 42 and the second journal portion 43. The first journal portion 42, the second journal portion 43, the first intermediate shaft portion 44 and the second intermediate shaft portion 45 are arranged to be coaxial with each other.

The first journal portion 42 is rotatably supported by the first bearing 18. The rotor 14 of the electric motor 11 is connected coaxially to the upper end portion of the shaft portion 40, which projects from the first bearing 18. The second journal portion 43 is rotatably supported by the second bearing 19.

Figure 6:
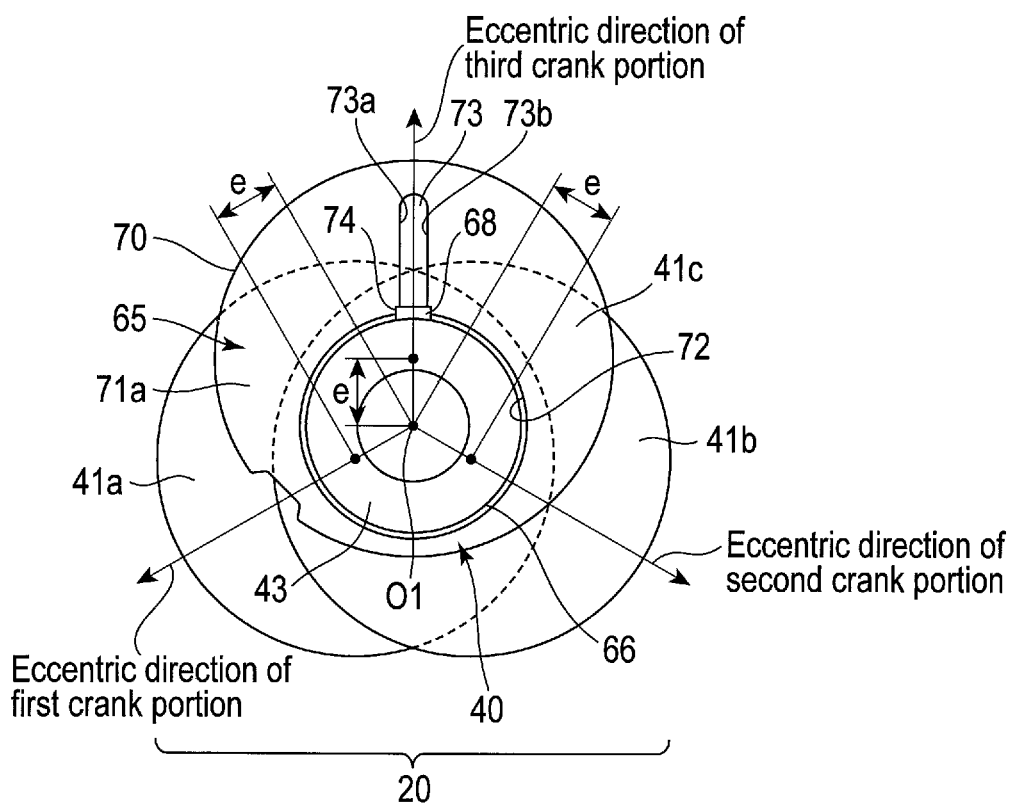
FIG. 6 is a front view showing locations of a first crank portion, a second crank portion and a third crank portion, with relative to each other when viewing the crankshaft from an axial direction in the first embodiment.

The first to third crank portions 41a, 41b and 41c are located between the first journal portion 42 and the second journal portion 43, and are arranged along the axial direction of the shaft portion 40 at intervals therebetween. As shown in FIGS. 6 and 8, the first to third crank portions 41a, 41b and 41c are disk-shaped elements each having a circular cross section, and in this embodiment, they are set to have the same thickness dimension and diameter taken along the axial direction of the shaft portion 40.

As shown in FIG. 6, the first to third crank portions 41a, 41b and 41c are eccentric with respect to a straight axial line O1 passing along the center of rotation of the first journal portion 42 and the second journal portion 43. That is, eccentric directions of the first to third crank portions 41a, 41b and 41c with respect to the axial line O1 of the shaft portion 40 are each shifted by 120 degrees to the circumferential direction of the shaft portion 40. The eccentricities e of the first to third crank portions 41a, 41b and 41c with respect to the axial line O1 of the shaft portion 40 are identical to each other.

Moreover, the first intermediate shaft portion 44 of the shaft portion 40 located on the axial line O1 and between the first crank portion 41a and the second crank portion 41b, and penetrates the through-hole 16a of the first intermediate partition plate 16.

The second intermediate shaft portion 45 of the shaft portion 40 is located on the axial line O1 and between the second crank portion 41b and the third crank portion 41c, and is fit with the bearing hole 22 of the second intermediate partition plate 17 so as to be slidable along the axial rotation direction. By this fitting, the second intermediate partition plate 17 also serves as the function of the third bearing to support an intermediate portion of the shaft portion 40 between the first bearing 18 and the second bearing 19.

As shown in FIG. 2, the first crank portion 41a of the crankshaft 20 is accommodated in the first cylinder chamber 27. The second crank portion 41b is accommodated in the second cylinder chamber 28. Further, the third crank portion 41c is accommodated in the third cylinder chamber 31.

A ring-like roller 47 is fit with an outer circumferential surface of the first crank portion 41a. The roller 47 is formed to follow the crankshaft 20, thus eccentrically rotating within the first cylinder chamber 27.

An upper end face of the roller 47 is slidably in contact with a lower surface of the flange portion 23 of the first bearing 18. A lower end surface of the roller 47 is slidably in contact with an upper surface of the first intermediate partition plate 16. Thus, the airtightness of the first cylinder chamber 27 is secured.

A ring-like roller 48 is fit with an outer circumferential surface of the second crank portion 41b. The roller 48 is formed to follow the crankshaft 20, thus eccentrically rotating within the second cylinder chamber 28.

An upper end face of the roller 48 is slidably in contact with a lower surface of the first intermediate partition plate 16. A lower end surface of the roller 48 is slidably in contact with an upper surface of the second intermediate partition plate 17. Thus, the airtightness of the second cylinder chamber 28 is secured.

A ring-like roller 49 is fit with an outer circumferential surface of the third crank portion 41c. The roller 49 is formed to follow the crankshaft 20, thus eccentrically rotating within the third cylinder chamber 31.

An upper end face of the roller 49 is slidably in contact with a lower surface of the second intermediate partition plate 17. A lower end surface of the roller 49 is slidably in contact with an upper surface of the flange portion 29 of the second bearing 19. Thus, the airtightness of the third cylinder chamber 31 is secured.

As shown in FIG. 3, which illustrates the first coolant compression unit 15A as a representative, the vane 50 is supported by the first cylinder body 21a. The vane 50 can be moved along a radial direction of the first cylinder chamber 27, and a distal end portion of the vane 50 is slidably pressed on an outer circumferential surface of the roller 47.

The vane 50, in collaboration with the roller 47, partitions the first cylinder chamber 27 into a suction region R1 and a compression region R2. Therefore, when the roller 47 eccentrically rotates within the first cylinder chamber 27, the volumes of the suction region R1 and the compression region R2 of the first cylinder chamber 27 continuously vary. Although illustration is omitted, the second cylinder chamber 28 and the third cylinder chamber 31 are also each partitioned into the suction region R1 and the compression region R2 by a similar vane.

As shown in FIG. 2, the first cylinder chamber 27 of the compressor compression mechanism 12 is connected to the accumulator 8 via the first suction pipe 51. The second cylinder chamber 28 and the third cylinder chamber 31 of the compressor compression mechanism 12 are connected to the accumulator 8 via the second intermediate partition plate 17 and the second suction pipe 52.

More specifically, as shown in FIGS. 2 and 3, a first suction port 53 communicating to the first cylinder chamber 27 is formed inside the first cylinder body 21a. The first connecting pipe 54 is connected to the first suction port 53 by means of press fit or the like. The first connecting pipe 54 penetrates the circumferential wall 10a of the airtight container 10 to project out of the airtight container 10, and a downstream end of the first suction pipe 51 is airtightly connected to the projecting end of the first connecting pipe 54.

As shown in FIG. 4, a joint portion 56 is formed in a part of an outer circumferential portion of the second intermediate partition plate 17. The joint portion 56 overhangs from the outer circumferential portion of the second intermediate partition plate 17 towards the circumferential wall 10a of the airtight container 10. A second suction port 57 and two-way branch passages 58a and 58b, which branch from the downstream end of the second suction port 57, are formed in the joint portion 56.

A second connecting pipe 59 is connected to the second suction port 57 by means of press fit or the like. The second connecting pipe 59 penetrates the circumferential wall 10a of the airtight container 10 to project out of the airtight container 10, and the downstream end of the second suction pipe 52 is airtightly connected to the projecting end of the second connecting pipe 59.

The branch passage 58a is opened in the upper surface of the second intermediate partition plate 17 so as to communicate to the second cylinder chamber 28. The other branch passage 58b is opened in the lower surface of the second intermediate partition plate 17 so as to communicate to the third cylinder chamber 31.

As shown in FIG. 2, the first discharge valve 60 is provided in the flange portion 23 of the first bearing 18. The first discharge valve 60 opens when the pressure of the compression region R2 of the first cylinder chamber 27 reaches a predetermined value, whereas the outlet side of the first discharge valve 60 communicates to the first silencer chamber 34.

A second discharge valve 61 is provided in the first intermediate partition plate 16. The second discharge valve 61 opens when the pressure of the compression region R2 of the second cylinder chamber 28 reaches a predetermined value, whereas the outlet side of the second discharge valve 61 communicates to the first silencer chamber 34 via a first discharge passage (not shown) provided inside the first intermediate partition plate 16 and the first cylinder body 21a.

A third discharge valve 62 is provided in the flange portion 29 of the second bearing 19. The third discharge valve 62 opens when the pressure of the compression region R2 of the third cylinder chamber 31 reaches a predetermined value, whereas the outlet side of the third discharge valve 62 communicates to the second silencer chamber 36. The second silencer chamber 36 communicates to the first silencer chamber 34 via a second discharge passage (not shown).

In the 3-cylinder rotary compressor 2 with such a structure, when the crankshaft 20 is rotated by the electric motor 11, the rollers 47, 48 and 49 eccentrically rotate within the first to third cylinder chambers 27, 28 and 31, respectively. Thus, the volumes of the suction region R1 and the compression region R2 of each of the first to third cylinder chambers 27, 28 and 31 change and the gaseous coolant in the accumulator 8 is guided to the suction region R1 of each of the first to third cylinder chambers 27, 28 and 31 from the first suction pipe 51 and the second suction pipe 52.

The gaseous coolant guided to the first suction port 53 from the first suction pipe 51 is suctioned into the suction region R1 of the first cylinder chamber 27. The gaseous coolant suctioned in the suction region R1 of the first cylinder chamber 27 is gradually compressed in the process in which the suction region R1 shifts to the compression region R2. When the pressure of the gaseous coolant reaches a predetermined value, the first discharge valve 60 opens, and the gaseous coolant compressed by the first cylinder chamber 27 is discharged to the first silencer chamber 34.

Part of the gaseous coolant guided from the second suction pipe 52 to the second suction port 57 of the second intermediate partition plate 17 is suctioned to the suction region R1 of the second cylinder chamber 28 through the branch passage 58a. The gaseous coolant suctioned in the suction region R1 of the second cylinder chamber 28 is gradually compressed in the process in which the suction region R1 shifts to the compression region R2. When the pressure of the gaseous coolant reaches a predetermined value, the second discharge valve 61 opens and thus the gaseous coolant compressed by the second cylinder chamber 28 is guided to the first silencer chamber 34 via the first discharge passage.

The remaining gaseous coolant guided from the second suction pipe 52 to the second suction port 57 is suctioned in the suction region R1 of the third cylinder chamber 31 through the other branch passage 58b. The gaseous coolant suctioned in the suction region R1 of the third cylinder chamber 31 is gradually compressed in the process in which the suction region R1 shifts to the compression region R2. When the pressure of the gaseous coolant reaches a predetermined value, the third discharge valve 62 opens and thus the gaseous coolant compressed by the third cylinder chamber 31 is discharged to the second silencer chamber 36. The gaseous coolant discharged to the second silencer chamber 36 is guided to the first silencer chamber 34 via the second discharge passage.

The eccentric directions of the first to third crank portions 41a, 41b and 41c of the crankshaft 20 with respect to the axial line O1 of the shaft portion 40 are each shifted by 120° along the circumferential direction of the shaft portion 40. With this structure, phase differences equivalent to the timings of discharging of gaseous coolants compressed by the first to third cylinder chambers 27, 28 and 31 are created.

The gaseous coolants compressed by the first to third cylinder chambers 27, 28 and 31 merge in the first silencer chamber 34, and the merged coolant is then continuously discharged to the inside of the airtight container 10 from the exhaust hole of the first outlet muffler 33. The gaseous coolant discharged to the inside of the airtight container 10 passes through the electric motor 11, and then it is guided to the four-way valve 3 from the outlet pipe 10b.

Meanwhile, in the crankshaft 20 of this embodiment, the first crank portion 41a and the second crank portion 41b are formed to be integrated with the shaft portion 40 as one body. In contrast, as shown in FIG. 7, the third crank portion 41c is a crank piece 65, an element separate from the shaft portion 40, and the crank piece 65 is built in the shaft portion 40.

More specifically, the shaft portion 40, the first crank portion 41a and the second crank portion 41b are an integral structure molded by casting, which is formed of a metal material for casting, such as cast iron or cast steel.

The shaft portion 40, the first crank portion 41a and the second crank portion 41b are formed to have a predetermined shape and dimensions by subjecting a cast product unloaded from a metallic mold to cutting using a machine tool such as an engine lathe.

Figure 7:
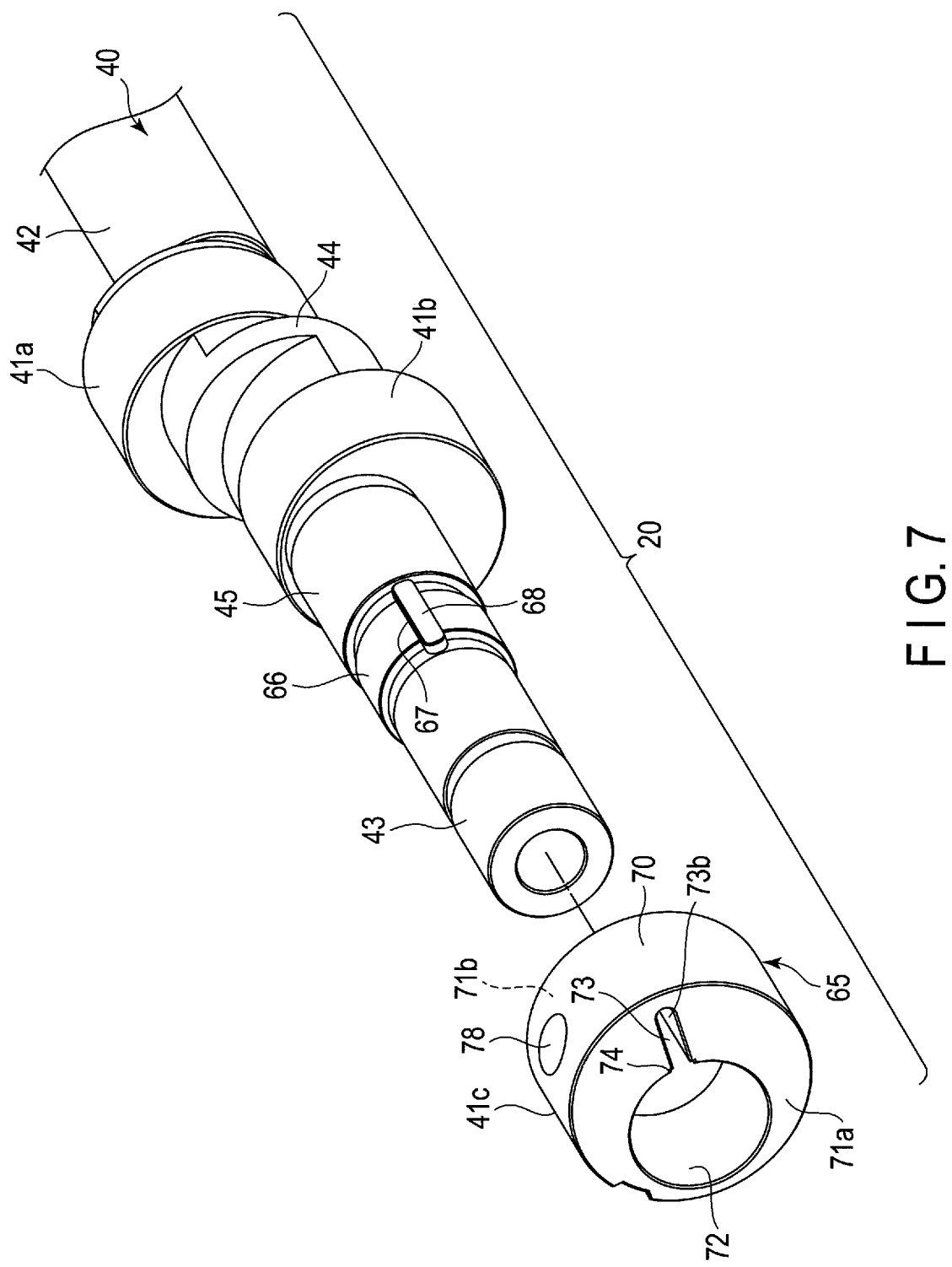
FIG. 7 is a perspective view of the crankshaft in a state where a crank piece is detached from a crank mount portion in the first embodiment.

As best shown in FIG. 7, the shaft portion 40 of this embodiment includes a crank attachment portion 66 between the second intermediate shaft portion 45 and the second journal portion 43. The crank attachment portion 66 is a shaft-like element having a circular cross section, and is located coaxial with the second intermediate shaft portion 45 and the second journal portion 43. The crank attachment portion 66 has a diameter larger than that of the second journal portion 43, but smaller than that of the second intermediate shaft portion 45.

Further, a first key groove 67 is formed in the outer circumferential surface of the crank attachment portion 66. The first key groove 67 extends along the axial direction of the shaft portion 40, and also it is opened in the boundary between the crank attachment portion 66 and the second journal portion 43. A key 68 is fit into the first key groove 67. The key 68 projects out from the outer circumferential surface of the crank attachment portion 66.

Figure 10:
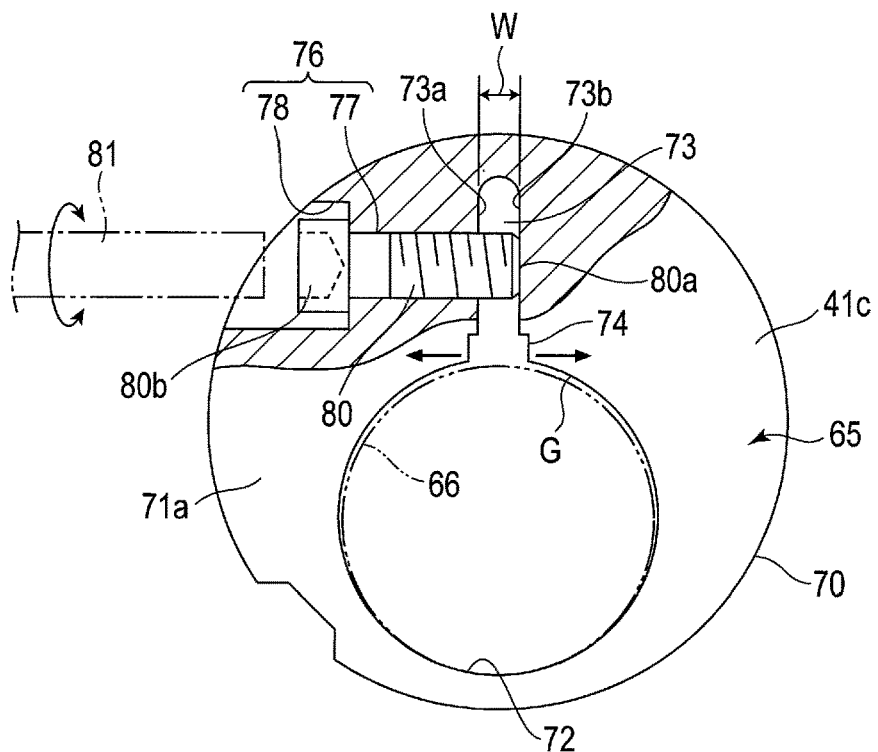
FIG. 10 is a front view of the crank piece, showing partially a cross section thereof, in a state where the width of a slot is expanded with a tightening bolt, in the first embodiment.

As shown in FIGS. 8 to 10, the crank piece 65 is a disk-shaped element having the same outer diameter and thickness as those of the first crank portion 41a and the second crank portion 41b, and is formed, for example, of a metal material for casting, such as cast iron or cast steel.

The crank piece 65 comprises an outer circumferential surface 70 to be fit with the roller 49, a first end surface 71a adjacent to the second journal portion 43 and a second end surface 71b adjacent to the second intermediate shaft portion 45. The outer circumferential surface 70, the first end surface 71a and the second end surface 71b are finished to be smooth surfaces by cutting.

A circular fitting hole 72 and a slit-like slot 73 are formed in the crank piece 65. The fitting hole 72 is formed at a position eccentric from the center of the crank piece 65, and is opened in the first end surface 71a and the second end surface 71b of the crank piece 65. The inner diameter of the fitting hole 72 is set slightly smaller than the outer diameter of the crank attachment portion 66, and the crank attachment portion 66 is fit inside the fitting hole 72 with a predetermined "interference".

The slot 73 has a width dimension W much smaller than the inner diameter of the fitting hole 72, and extends linearly towards an outer side of the fitting hole 72 in the diameter direction from the inner circumference side of the fitting hole 72 along the eccentric direction of the third crank portion 41c with respect to the shaft portion 40. The slot 73 is opened in the first end surface 71a and the second end surface 71b of the crank piece 65. Further, one end of the slot 73 is opened in the inner circumferential surface of the fitting hole 72. The other end of the slot 73 is closed inside the crank piece 65.

Thus, the slot 73 includes a pair of inner surfaces 73a and 73b facing each other with an interval therebetween, and the inner surfaces 73a and 73b are formed continuous to the first end surface 71a and the second end surface 71b of the crank piece 65 and the inner circumferential surface of the fitting hole 72.

As shown in FIG. 10, one end of the slot 73 opened in the inner circumferential surface of the fitting hole 72 is formed to have an expanded width to form a second key groove 74. The second key groove 74 opposes the first key groove 67 of the crank attachment portion 66, and also a key 68 projecting from the outer circumferential surface of the crank attachment portion 66 is fit with the second key groove 74.

As shown in FIGS. 8 to 10, a guide hole 76 is formed in the crank piece 65. The guide hole 76 extends along a direction normal to the slot 73 inside the crank piece 65. According to this embodiment, the guide hole 76 consists of a screw-thread hole 77 opened in one inner surface 73a of the slot 73, and an insertion opening 78 opened in the outer circumferential surface of the crank piece 65, and the insertion opening 78 is larger than the screw-thread hole 77 in diameter.

According to this embodiment, there is an "interference" of, for example, about 28 μm between the crank attachment portion 66 of the shaft portion 40 and the fitting hole 72 of the crank piece 65, and therefore the crank attachment portion 66 cannot be fit in the fitting hole 72 as it is.

In this embodiment, before fitting the crank attachment portion 66 in the fitting hole 72, a bolt 80 with a hexagon socket, which is an example of the jig for expansion, is inserted in the guide hole 76. As shown in FIGS. 9 and 10, the hexagon socket bolt 80 is screwed into the screw-thread hole 77 from the insertion opening 78.

By the screwing, a tip portion of the hexagon socket bolt 80 advances in the slot 73 so as to cross the slot 73 along the width direction, a tip surface 80a of the hexagon socket bolt 80 abuts against the other inner surface 73b of the slot 73. At the time when the tip surface 80a of the hexagon socket bolt 80 abuts against the other inner surface 73b, a socket portion 80b of the hexagon socket bolt 80 remains in the insertion opening 78 without projecting out of the outer circumferential surface 70 of the crank piece 65.

Next, a specific procedure for fitting the crank piece 65 into the crank attachment portion 66 of the shaft portion 40 during the assembling of the 3-cylinder rotary compressor 2, will now be described.

First, as shown in FIG. 9, the hexagon socket bolt 80 is inserted in the guide hole 76 of the crank piece 65 in the state of a single member from an insertion opening 78 side. Then, a stick wrench 81 shown in FIG. 10 is fit in the socket portion 80b of the hexagon socket bolt 80, and the hexagon socket bolt 80 is screwed into the screw-thread hole 77 using the stick wrench 81. Thus, the tip surface 80a of the hexagon socket bolt 80 abuts against the other inner surface 73b of the slot 73, so as to forcedly press the other inner surface 73b in a direction parting away from one inner surface 73a.

Consequently, as indicated by an arrow shown in FIG. 10, the width dimension W of the slot 73 widens by, for example, about 30 μm. The one end of the slot 73 is opened in the fitting hole 72, and therefore as the slot 73 expands, the fitting hole 72 is deformed so as to microscopically expand the inner diameter of the fitting hole 72.

Thus, a gap G as shown in FIG. 10 is created partially between the outer circumferential surface of the crank attachment portion 66 and the fitting hole 72 so that the "interference" between the crank attachment portion 66 and the fitting hole 72 disappears, and thus it is shifted to the state that the crank attachment portion 66 can be inserted to the fitting hole 72.

Then, the shaft portion 40 is inserted in the fitting hole 72 of the crank piece 65 from a second journal portion 43 side, and also the relative positions of the crank piece 65 and the shaft portion 40 are adjusted so as to match the second key groove 74 of the crank piece 65 with the key 68 of the crank attachment portion 66.

When the second key groove 74 matches the key 68, the crank attachment portion 66 is pushed into the fitting hole 72 of the crank piece 65 to locate the crank piece 65 on the crank attachment portion 66. Thus, the shaft portion 40 and the crank piece 65 are positioned along the circumferential direction, and the eccentric direction of the crank piece 65 (third crank portion 41c) to the shaft portion 40 is set.

Subsequently, the hexagon socket bolt 80 is loosened by the stick wrench 81, and the hexagon socket bolt 80 is removed from the guide hole 76 of the crank piece 65. By removing the hexagon socket bolt 80, the pressure on the other inner surface 73b of the slot 73 is released, and the crank piece 65 is elastically deformed so that the fitting hole 72 restores the original form.

As a result, the crank attachment portion 66 of the shaft portion 40 is fit in the fitting hole 72 of the crank piece 65 by the predetermined "interference". Thus, the shaft portion 40 and the crank piece 65 are fixed into an integrated state in the state of "fitting via interference", and the assembling of the crankshaft 20 is completed.

According to the first embodiment, the crank piece 65, which is a separate element from the shaft portion 40, comprises the slit-like slot 73 opened in the fitting hole 72, and by forcedly expanding the width dimension W of the slot 73 with the hexagon socket bolt 80, the fitting hole 72 is deformed to expand the inner diameter of the fitting hole 72. Therefore, even if there is the predetermined "interference" between the crank attachment portion 66 of the shaft portion 40 and the fitting hole 72 of the crank piece 65, the crank attachment portion 66 of the shaft portion 40 can be easily inserted into the fitting hole 72 of the crank piece 65.

In addition, after inserting the crank attachment portion 66 of the shaft portion 40 into the fitting hole 72 of the crank piece 65, the shaft portion 40 and the crank piece 65 are firmly fixed in the state of "fitting via interference" by removing the hexagon socket bolt 80 from the guide hole 76 of the crank piece 65.

Thus, the crank piece 65 can be easily fixed to the shaft portion 40, thereby improving the workability in the assembly of the crankshaft 20.

Further, according to first embodiment, the shaft portion 40 and the crank piece 65 are firmly fixed in the state of "fitting via interference" and therefore the fixation strength of the crank piece 65 to the shaft portion 40 can be fully secured. As a result, it is possible to avoid rattling the crank piece 65 during operation of the 3-cylinder rotary compressor 2.

Further, in the state where the crank piece 65 is fixed to the shaft portion 40, when the hexagon socket bolt 80 is screwed into the screw-thread hole 77 of the crank piece 65 so as to expand the width dimension W of the slot 73, the fitting hole 72 can be deformed again to be able to extract the shaft portion 40 from the fitting hole 72. Thus, even if the shaft portion 40 and the crank piece 65 are fixed together in the state of "fitting via interference", the crank piece 65 is removable, and therefore, for example, when the crank piece 65 needs to be replaced, it can be done easily.

Moreover, the key 68 is interposed between the shaft portion 40 and the crank piece 65, and therefore the shaft portion 40 and the crank piece 65 can be positioned along the circumferential direction with reference to the key 68.

Thus, the eccentric direction of the crank piece 65 to the shaft portion 40 can be set with high accuracy.

According to the first embodiment, the second intermediate partition plate 17, which co-functions as a third bearing, is located between the second crank portion 41b and the third crank portion 41c of the crankshaft 20. The third crank portion 41c is formed from the crank piece 65, which is a separate element from the shaft portion 40, and the crank piece 65 is fixed to the crank attachment portion 66 of the shaft portion 40 in the state of "fitting via interference", as already stated.

Therefore, when inserting the second intermediate shaft portion 45 of the shaft portion 40 in the bearing hole 22 of the second intermediate partition plate 17, it suffices if the second intermediate shaft portion 45 of the shaft portion 40 is inserted in the bearing hole 22 of the second intermediate partition plate 17 from the second journal portion 43 side, before fitting the crank piece 65 in the crank attachment portion 66 of the shaft portion 40.

Thus, the second intermediate partition plate 17 is no longer needed to be divided into two at the position of the bearing hole 22, thus making it possible to prevent the coolant compressed by the second cylinder chamber 28 or the third cylinder chamber 31 from leaking or the like.

In the first embodiment, the key 68 is an element to position the shaft portion 40 and the crank piece 65 along the circumferential direction, and does not have a function of fixing the crank piece 65 to the shaft portion 40. Therefore, if the fixation of the shaft portion 40 and the crank piece 65 is completed, the key 68 may be removed from between the shaft portion 40 and the crank piece 65.

Further, when positioning the shaft portion 40 and the crank piece 65 along the circumferential direction without using the key 68, for example, marking may be made on both of the shaft portion 40 and the crank piece 65, to be matched with each other.

Second Embodiment

Figure 11:
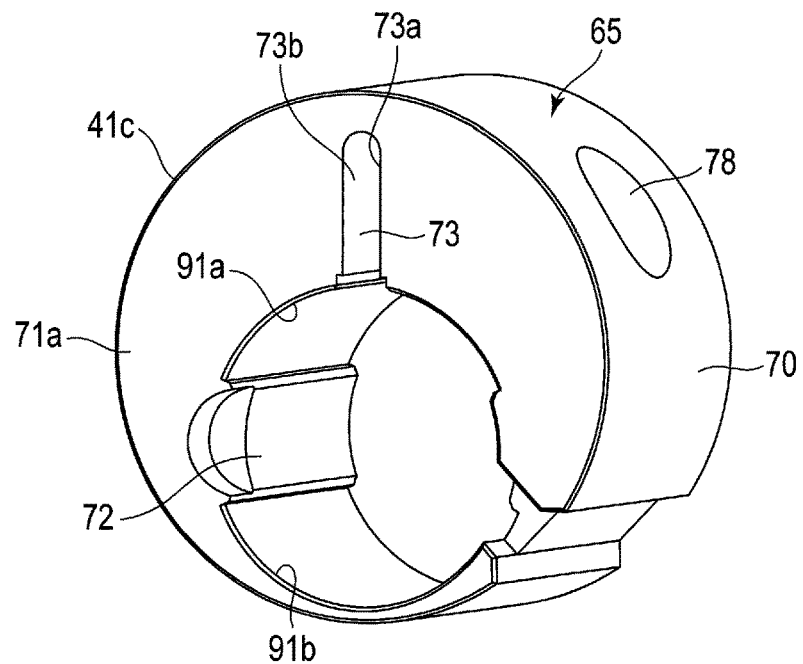
FIG. 11 is a perspective view of a crank piece used in the second embodiment.
Figure 12:
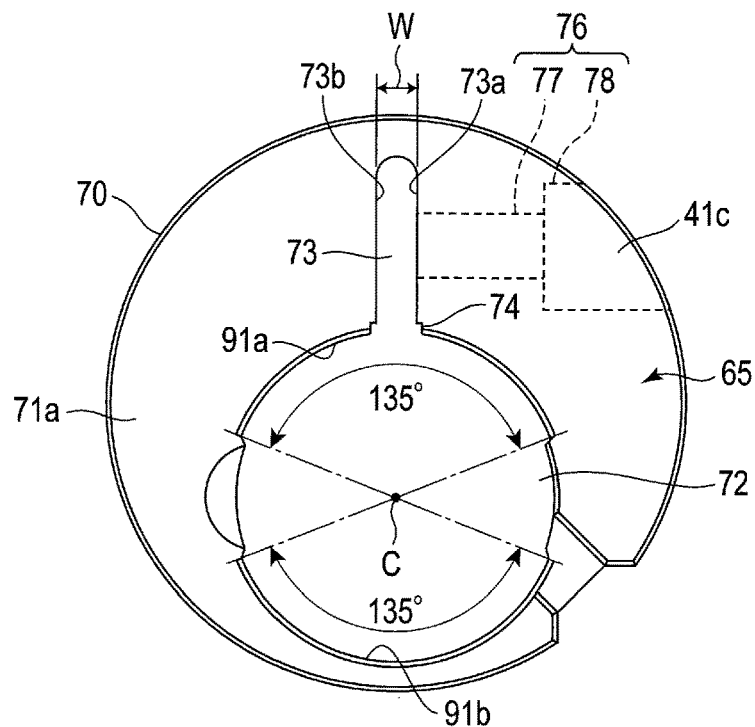
FIG. 12 is a front view of the crank piece used in the second embodiment.
Figure 13:
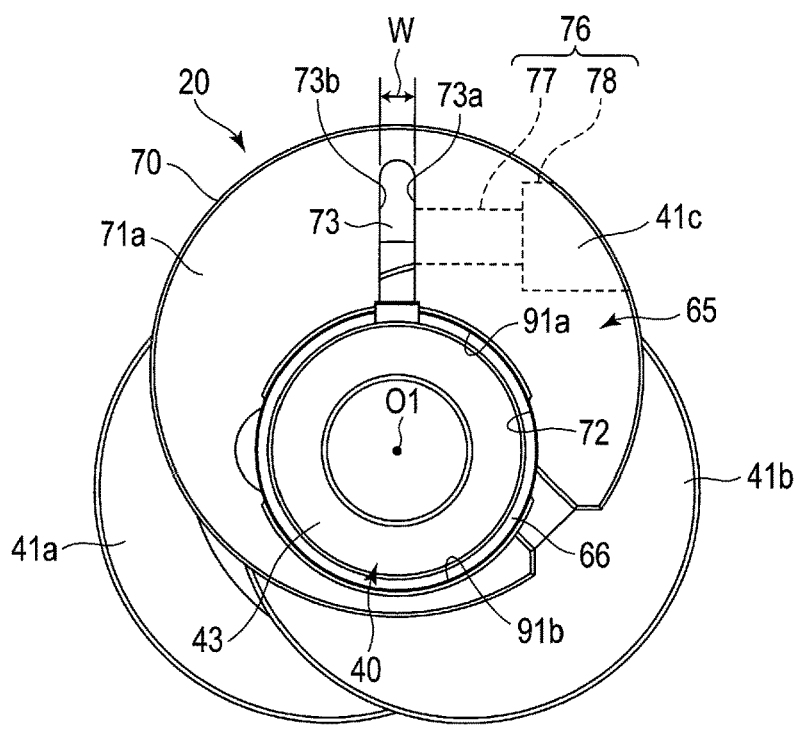
FIG. 13 is a front view of the crankshaft of the second embodiment as viewed from an axial direction.

FIGS. 11 to 13 disclose the second embodiment. The second embodiment is different from the first embodiment in the shape of the fitting hole 72 of the crank piece 65. The rest of the structure of the crankshaft 20 is the same as that of the first embodiment. Therefore, in the second embodiment, the same structural parts are denoted by the same referential symbols as those of the first embodiment, and the explanations therefor will be omitted.

As shown in FIG. 10 of the first embodiment, when the width dimension W of the slot 73 is expanded using the hexagon socket bolt 80, the fitting hole 72 deforms to expand the inner diameter, but the deformation cannot occur uniformly all along the entire circumference. Thus, in a microscopic view, undeniably the shape is distorted. For this reason, if the circular crank attachment portion 66 is being inserted in the deformed fitting hole 72, the outer circumferential surface of the crank attachment portion 66 may interfere with the inner circumferential surface of the fitting hole 72.

To avoid this, in the second embodiment, a first run-off portion 91a and a second run-off portion 91b are formed in two locations of the inner circumferential surface of the fitting hole 72. The first run-off portion 91a and the second run-off portion 91b are formed, for example, by performing removal processing on the inner circumferential surface of the fitting hole 72, to have such a shape circularly cut as to increase the inner diameter of the fitting hole 72. In other words, the first run-off portion 91a and the second run-off portion 91b are circularly cut in a direction parting away from the outer circumferential surface of the crank attachment portion 66.

Further, the first run-off portion 91a and the second run-off portion 91b are formed so as to oppose each other while interposing of the center C of the fitting hole 72 in between, over a range of 135° along the circumferential direction of the fitting hole 72. In this embodiment, one end of the slot 73 is opened in an intermediate portion along the circumferential direction of the first run-off portion 91a.

According to the second embodiment, the first run-off portion 91a and the second run-off portion 91b, circularly cut, are formed in the inner circumferential surface of the fitting hole 72 in a direction to increase the inner diameter. With this structure, even if the fitting hole 72 distortedly deforms, it is possible to avoid the interference between the outer circumferential surface of the crank attachment portion 66 and the inner circumferential surface of the fitting hole 72, which may occur while inserting the crank attachment portion 66 of the shaft portion 40 in the fitting hole 72 of the crank piece 65.

Thus, the crank attachment portion 66 of the shaft portion 40 can be easily inserted in the fitting hole 72 of the crank piece 65, for example, manually, thereby improving the workability in fixing of the crank piece 65 to the crank attachment portion 66 of the shaft portion 40.

Furthermore, if the crank attachment portion 66 of the shaft portion 40 is inserted into the fitting hole 72 of the crank piece 65 and thereafter the hexagon socket bolt 80 is removed from the crank piece 65, it is shifted to the state as shown in FIG. 13, where the crank attachment portion 66 of the shaft portion 40 is fit in the inner circumferential surface of the fitting hole 72, which is lodged off from the first run-off portion 91a and the second run-off portion 91b by the predetermined "interference".

Thus, the shaft portion 40 and the crank piece 65 are fixed to be integrated as one body in the state of "fitting via interference".

In the second embodiment, the first and second run-off portions 91a and 91b are formed in two locations while interposing the center C of the fitting hole 72 in between, but the structure is not limited to this. For example, the second run-off portion 91b may be omitted and the range of the first run-off portion 91a taken along the circumferential direction of the fitting hole 72 may be expanded.

Third Embodiment

FIGS. 14 and 15 disclose the third embodiment. The third embodiment is different from the first embodiment in how the crank piece 65 is fixed to the shaft portion 40. The rest of the structure of the crankshaft 20 is the same as that of the first embodiment. Therefore, in the third embodiment, the same structural parts are denoted by the same referential symbols as those of the first embodiment, and the explanations therefor will be omitted.

As shown in FIG. 14, the guide hole 76 of the crank piece 65 comprises an insertion hole 78, a through hole 92 without a screw thread, and a screw-thread hole 93. The through hole 92 is formed along a direction intersecting the slot 73, and opened in one inner surface 73a of the slot 73. The screw-thread hole 93 is located to be coaxial with the through hole 92 so as to open in the other inner surface 73b of the slot 73.

Further, in this embodiment, the inner diameter of the fitting hole 72 is set greater than the outer diameter of the crank attachment portion 66 of the shaft portion 40, and a gap G is created between the fitting hole 72 and the shaft portion 40. Thus, the fitting hole 72 and the shaft portion 40 are fit with each other in the state of "clearance fit".

As shown in FIG. 15, a bolt 95 with a hexagon socket is inserted into the guide hole 76 of the crank piece 65. The hexagon socket bolt 95 is an example of the fastener, and is screwed into the screw-thread hole 93 from the insertion opening 78 while penetrating the through hole 92. Thus, the hexagon socket bolt 95 is accommodated in the guide hole 76 while crossing the slot 73.

Moreover, when a tip portion 95a of the hexagon socket bolt 95 is screwed into the screw-thread hole 93, an end surface of the socket portion 95b of the hexagon socket bolt 95 abuts against a stepped portion 96 located in the boundary between the insertion opening 78 and the through hole 92. Here, the socket portion 95b also is settled in the insertion opening 78 without projecting from the outer circumferential surface 70 of the crank piece 65.

Next, a specific procedure for fitting the crank piece 65 into the crank attachment portion 66 of the shaft portion 40 during the assembling of the crankshaft 20, will now be described.

First, as shown in FIG. 14, the crank attachment portion 66 of the shaft portion 40 is inserted in the fitting hole 72 of the crank piece 65 in the state of "clearance fit" so as to match the second key groove 74 of the crank piece 65 and the key 68 of the crank attachment portion 66 each other. Then, the hexagon socket bolt 95 is inserted in the guide hole 76 of the crank piece 65 from an insertion opening 78 side.

Next, as shown in FIG. 15, the hexagon socket bolt 95 is screwed into the screw-thread hole 93 using the stick wrench 81. By the screwing, the hexagon socket bolt 95 crosses the slot 73, and the end surface of the socket portion 95b of the hexagon socket bolt 95 abuts against the stepped portion 96 of the bottom of the insertion opening 78.

When the hexagon socket bolt 95 is fastened more firmly in this state, the crank piece 65 elastically deforms so as to narrow the width dimension W of the slot 73 as indicated by the arrow head shown in FIG. 15. One end of the slot 73 is opened in the inner circumferential surface of the fitting hole 72, and therefore as the width dimension W of the slot 73 narrows, the fitting hole 72 deforms so as to narrow the inner diameter of the fitting hole 72.

As a result, the gap G between the crank attachment portion 66 and the fitting hole 72 partially disappears, and the crank attachment portion 66 is fit in the fitting hole 72 of the crank piece 65 by predetermined "interference". Thus, the shaft portion 40 and the crank piece 65 are fastened together and fixed as one body, and thus the assembly of the crankshaft 20 is completed.

According to the third embodiment, the crank piece 65, which is an element separated from the shaft portion 40, comprises a slit-like slot 73 opened in the fitting hole 72, and by forcedly narrowing the width dimension W of the slot 73 with the hexagon socket bolt 95, the fitting hole 72 is deformed so as to narrow the inner diameter of the fitting hole 72.

Therefore, at the time when inserting the crank attachment portion 66 of the shaft portion 40 into the fitting hole 72 of the crank piece 65, there is a gap G between the crank attachment portion 66 and the fitting hole 72, making it easy to insert the crank attachment portion 66 in the fitting hole 72.

In addition, only by the operation of tightening the hexagon socket bolt 95 after inserting the crank attachment portion 66 in the fitting hole 72, the shaft portion 40 and the crank piece 65 can be tightly fixed together as one body.

Thus, as in the first embodiment, the crank piece 65 to the shaft portion 40 can be easily fixed, thereby improving the workability of assembling the crankshaft 20.

Furthermore, according to the third embodiment, the shaft portion 40 and the crank piece 65 are tightly fixed as one body, the fixation strength of the crank piece 65 to the shaft portion 40 can be fully secured. As a result, it is possible to avoid the rattling of the crank piece 65 during the operation of the 3-cylinder rotary compressor 2.

Moreover, while the crank piece 65 is fixed to the shaft portion 40, the hexagon socket bolt 95 remains in the guide hole 76 of the crank piece 65. Therefore, if the hexagon socket bolt 95 is loosened to expand the width dimension W of the slot 73, the crank piece 65 elastically deforms so as to create a gap G, the same as the initial one, between the fitting hole 72 and the crank piece 65. Thus, the crank piece 65 is removal, and, for example, when the crank piece 65 needs to be replaced, it can be done easily.

In the third embodiment, the key 68 does not have a function of fixing the crank piece 65 to the shaft portion 40 as in the case of the first embodiment. Therefore, after fixation with the shaft portion 40 and the crank piece 65 is completed, the key 68 you may make be removed from between the shaft portion 40 and the crank piece 65.

Fourth Embodiment

Figure 16:
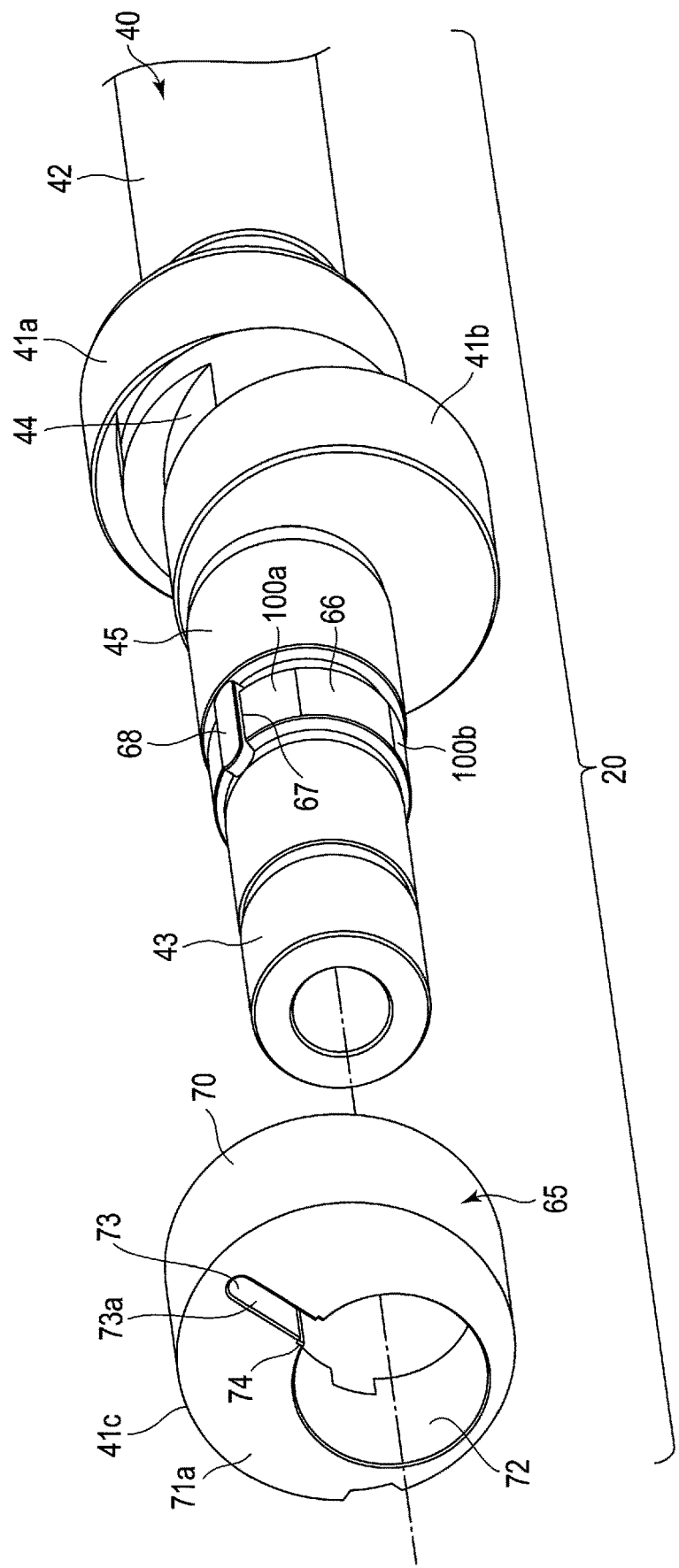
FIG. 16 is a perspective view of a crankshaft in a state where a crank piece is detached from a crank mount portion in the fourth embodiment.
Figure 17:
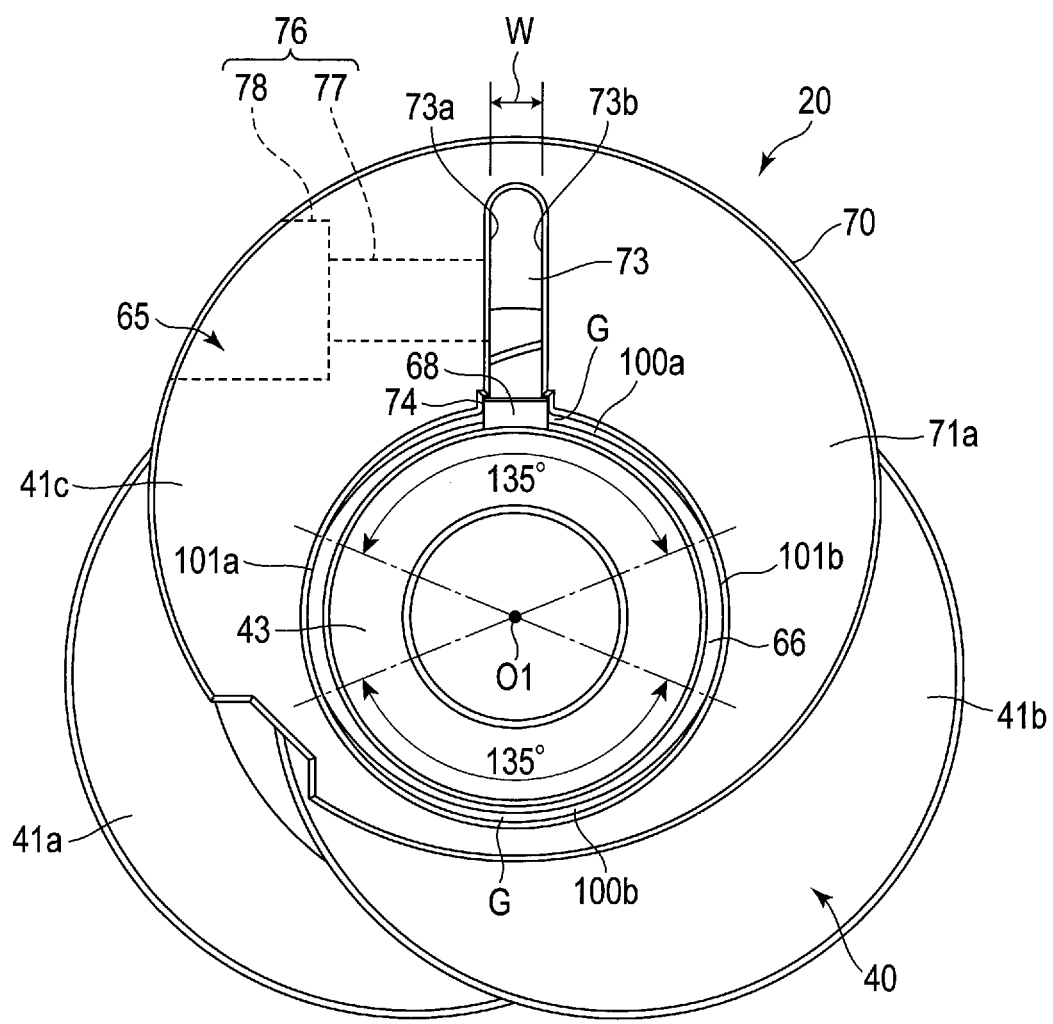
FIG. 17 is a front view of the crankshaft of the fourth embodiment as viewed from an axial direction.

FIGS. 16 and 17 disclose the fourth embodiment. The fourth embodiment is different from the first embodiment in the shape of the crank attachment portion 66 of the shaft portion 40. The rest of the structure of the crankshaft 20 is the same as that of the first embodiment. Therefore, in the fourth embodiment, the same structural parts are denoted by the same referential symbols as those of the first embodiment, and the explanations therefor will be omitted.

As shown in FIGS. 16 and 17, in the fourth embodiment, a first run-off portion 100a and a second run-off portion 100b are formed in two locations of the outer circumferential surface of the crank attachment portion 66 of the shaft portion 40. The first run-off portion 100a and the second run-off portion 100b are formed by carrying out cutting in two locations which interpose the axial line O1 of the shaft portion 40 therebetween, on, for example, the outer circumferential surface of the crank attachment portion 66, so as to be curved circularly at a curvature than that of the shaft portion 40. In other words, the first run-off portion 100a and the second run-off portion 100b each have a shaped circularly cut in a direction parting from the inner circumferential surface of the fitting hole 72 of the crank piece 65.

According to this embodiment, the first run-off portion 100a and the second run-off portion 100b are formed over a range of, for example, 135° in an outer circumferential direction of the crank attachment portion 66. Thus, the outer circumferential surface of the crank attachment portion 66 includes two regions 101a and 101b located between the first run-off portion 100a and the second run-off portion 100b. The outer diameter of the regions 101a and 101b is set slightly greater rather than the inner diameter of the fitting hole 72 of the crank piece 65, and the two regions 101a and 101b are fit in the fitting hole 72 by a predetermined "interference".

Further, one end of the slot 73 whose width dimension can be expanded with the hexagon socket bolt 80 faces the intermediate portion along the circumferential direction of the first run-off portion 100a of the crank attachment portion 66.

In the fourth embodiment, if the width dimension W of the slot 73 is expanded with the hexagon socket bolt 80, the fitting hole 72 deforms to microscopically expand the inner diameter of the fitting hole 72 as in the case of the first embodiment. Therefore, the "interference" between the two regions 101a and 101b of the crank attachment portion 66 and the fitting hole 72 disappears, and it shifts to the state where the crank attachment portion 66 can be inserted in the fitting hole 72.

However, the fitting hole 72 cannot deform uniformly over the entire circumference, and therefore undeniably, the shape thereof is microscopically distorted. As a result, when the crank attachment portion 66 is inserted into the deformed fitting hole 72, the outer circumferential surface of the crank attachment portion 66 may interfere with the inner circumferential surface of the fitting hole 72 each other.

In the fourth embodiment, the first run-off portion 100a and the second run-off portion 100b, circularly cut so as to increase the curvature, are formed in two locations of the outer circumferential surface of the crank attachment portion 66 to be fit in the fitting hole 72. Therefore, the gap G is secured between the first run-off portion 100a and the second run-off portion 100b, and the inner circumferential surface of the fitting hole 72.

Due to the presence of the first run-off portion 100a and the second run-off portion 100b, even if the fitting hole 72 deforms to be distorted, it is possible to avoid the interference between the outer circumferential surface of the crank attachment portion 66 and the inner circumferential surface of the fitting hole 72, which may occur when inserting the crank attachment portion 66 of the shaft portion 40 in the fitting hole 72 of the crank piece 65.

Thus, the crank attachment portion 66 of the shaft portion 40 can be easily inserted in the fitting hole 72 of the crank piece 65, for example, manually, thereby improving the workability of fixing the crank piece 65 to the crank attachment portion 66 of the shaft portion 40.

Moreover, when the hexagon socket bolt 80 is removed from the crank piece 65 after inserting the crank attachment portion 66 of the shaft portion 40 in the fitting hole 72 of the crank piece 65, it is shifted to the state that the two regions 101a and 101b of the crank attachment portion 66 are fit with the inner circumferential surface of the fitting hole 72 by the predetermined "interference".

Thus, the shaft portion 40 and the crank piece 65 are firmly fixed in the state of "fitting via interference", the fixation strength of the crank piece 65 to the shaft portion 40 can be fully secured. Therefore, it is possible to avoid the rattling of the crank piece 65 during the operation of the 3-cylinder rotary compressor 2.

Fifth Embodiment

Figure 18:
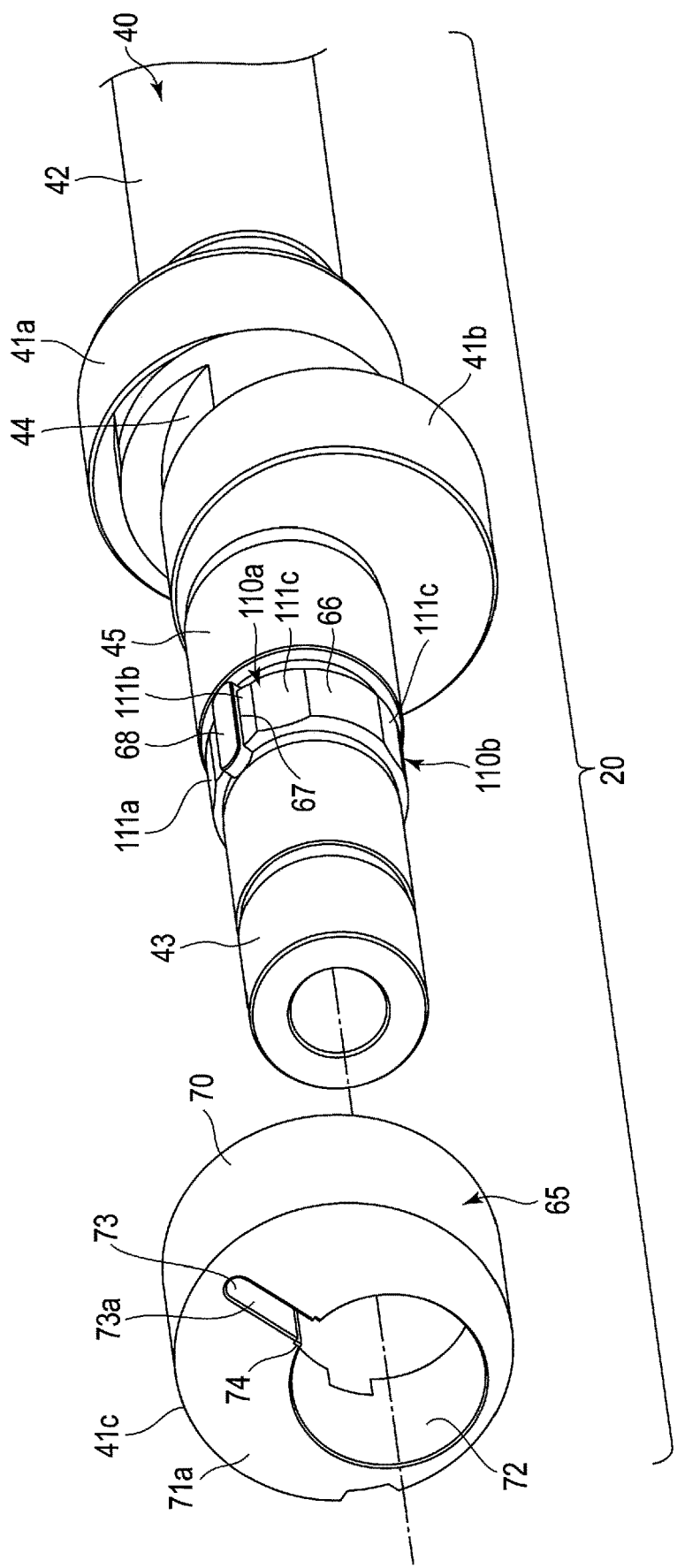
FIG. 18 is a perspective view of a crankshaft in a state where a crank piece is detached from a crank mount portion in the fifth embodiment.

FIGS. 18 and 19 disclose the fifth embodiment. The fifth embodiment is different from the fourth embodiment in the shape of the crank attachment portion 66 of the shaft portion 40. The rest of the structure of the crankshaft 20 is the same as that of the fourth embodiment.

As shown in FIGS. 18 and 19, a first run-off portion 110a and a second run-off portion 110b are formed in two locations of the outer circumferential surface of the crank attachment portion 66 of the shaft portion 40. The first run-off portion 110a and the second run-off portion 110b are formed by carrying out cutting in two regions interposing the axial line O1 of the shaft portion 40 therebetween, for example, along the outer circumferential surface of the crank attachment portion 66.

The first run-off portion 110a and the second run-off portion 110b each includes first to third flat surfaces 111a, 111b and 111c. The first to third flat surfaces 111a, 111b and 111c are arranged along the circumferential direction of the crank attachment portion 66 and are distant from the inner circumferential surface of the fitting hole 72 of the crank piece 65.

As shown in FIG. 19, the first flat surface 111a of the first run-off portion 110a and the third flat surface 111c of the second run-off portion 110b are arranged parallel to each other while interposing the axial line O1 of the shaft portion 40 therebetween. The second flat surface 111b of the first run-off portion 110a and the second flat surface 111b of the second run-off portion 110b are arranged parallel to each other while interposing the axial line O1 of the shaft portion 40 therebetween. The third flat surface 111c of the of the first run-off portion 110a and the first flat surface 111a of the second run-off portion 110b are arranged parallel to each other while interposing the axial line O1 of the shaft portion 40 therebetween.

According to this embodiment, the first run-off portion 110a and the second run-off portion 110b are formed over a range of, for example, 115° along the circumferential direction of the crank attachment portion 66. Thus, the outer circumferential surface of the crank attachment portion 66 includes two regions 112a and 112b located between the first run-off portion 110a and the second run-off portion 110b. The outer diameter of the regions 112a and 112b is set slightly greater rather than the outer diameter of the fitting hole 72 of the crank piece 65, and the two regions 112a and 112b are fit in the fitting hole 72 by the predetermined "interference".

Further, one end of the slot 73 whose width dimension can be expanded with the hexagon socket bolt 80 faces the intermediate portion of the second flat surface 111b of the first run-off portion 110a of the crank attachment portion 66.

In the fifth embodiment, if the width dimension W of the slot 73 is expanded with the hexagon socket bolt 80, the fitting hole 72 deforms to microscopically expand the inner diameter of the fitting hole 72 as in the case of the first embodiment. Therefore, the "interference" between the two regions 112a and 112b of the crank attachment portion 66 and the fitting hole 72 disappears, and it shifts to the state where the crank attachment portion 66 can be inserted in the fitting hole 72.

However, the fitting hole 72 cannot deform uniformly over the entire circumference, and therefore undeniably, the shape thereof is microscopically distorted. As a result, when the crank attachment portion 66 is inserted into the deformed fitting hole 72, the outer circumferential surface of the crank attachment portion 66 may interfere with the inner circumferential surface of the fitting hole 72 each other.

In the fifth embodiment, the first run-off portion 110a and the second run-off portion 110b are formed in two locations of the outer circumferential surface of the crank attachment portion 66 to be fit in the fitting hole 72, and the first run-off portion 110a and the second run-off portion 110b each includes the first to third flat surfaces 111a, 111b and 111c, cut such as to apart from the inner circumferential surface of the fitting hole 72.

Due to the presence of the first run-off portion 110a and the second run-off portion 110b, the gap G is secured between the first run-off portion 110a and the inner circumferential surface of the fitting hole 72 and between the second run-off portion 110b and the inner circumferential surface of the fitting hole 72.

With this structure, even if the fitting hole 72 deforms to be distorted, it is possible to avoid the interference between the outer circumferential surface of the crank attachment portion 66 and the inner circumferential surface of the fitting hole 72, which may occur when inserting the crank attachment portion 66 of the shaft portion 40 in the fitting hole 72 of the crank piece 65.

Thus, the crank attachment portion 66 of the shaft portion 40 can be easily inserted in the fitting hole 72 of the crank piece 65, for example, manually, thereby improving the workability of fixing the crank piece 65 to the crank attachment portion 66 of the shaft portion 40.

Moreover, when the hexagon socket bolt 80 is removed from the crank piece 65 after inserting the crank attachment portion 66 of the shaft portion 40 in the fitting hole 72 of the crank piece 65, it is shifted to the state that the two regions 112a and 112b of the crank attachment portion 66 are fit with the inner circumferential surface of the fitting hole 72 by the predetermined "interference".

Thus, the shaft portion 40 and the crank piece 65 are firmly fixed in the state of "fitting via interference", the fixation strength of the crank piece 65 to the shaft portion 40 can be fully secured. Therefore, it is possible to avoid the rattling of the crank piece 65 during the operation of the 3-cylinder rotary compressor 2.

In this embodiment, the third crank portion 41c of the crankshaft 20 is formed from the crank piece 65, which is a separate element from the shaft portion 40, but the embodiment is not limited to this structure. For example, all of the first to third crank portions 41a, 41b and 41c may be constituted from separate crank pieces 65 from the shaft portion 40, and the crank pieces 65 may be fastened and fixed to first to third crank attachment portions in three locations along the axial direction of the shaft portion 40 by means of "fitting via interference" or using bolts.

Moreover, in the above-provided embodiments, the width dimension of the slot is expanded by screwing the hexagon socket bolt into the screw-thread hole of the crank piece, but the element for expanding the width dimension is not limited to a bolt with a hexagon-head socket. For example, the width dimension of the slot may be expanded by removably pressing a wedge-shaped expanding tool into the slot, for example, from a side of the first or second end surface of the crank piece.

The above-provided embodiments are described in connection with the 3-cylinder rotary compressor including three cylinder chambers, but the number of cylinder chambers is not limited in particular. For example, it may one, two or four or more.

Furthermore, the above-provided embodiments are described in connection with a general rotary compressor with a vane which reciprocates along the diametrical direction of the cylinder chamber by following the eccentric rotation of the roller, as an example, but the embodiments can as well be implemented similarly, for example, in the so-called swing-type rotary compressor, in which the vane projects from the outer circumferential surface of the roller outwards in the diametric direction integrally as one body.

In addition, the rotary compressor is not limited to a vertical rotary compressor in which the crankshaft is vertically placed, but may be a horizontal rotary compressor in which the crankshaft is horizontally placed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A crankshaft comprising:
    a shaft portion comprising a straight axial line; and
    at least one crank portion provided in the shaft portion so as to be eccentric to the axial line of the shaft portion,
    the at least one crank portion being formed from a crank piece, which is an element separate from the shaft portion, and the crank piece comprising a fitting hole in which the shaft portion is fit by predetermined "interference", and a slit-like slot one end of which is opened in an inner circumferential surface of the fitting hole, and an other end of which extends along a diametric direction of the fitting hole so as to be closed inside the crank piece, and is opened in both end surfaces of the crank piece,
    the fitting hole being deformed so as to expand a diameter of the fitting hole when expanding a width of the slot, and the shaft portion being fit in the fitting hole of the crank piece by the predetermined "interference" when the shaft portion is inserted in the deformed fitting hole and the fitting hole restores an original form while the shaft portion is in the fitting hole.

2. The crankshaft of claim 1, further comprising:
    a screw-thread hole one end of which is opened in an outer circumferential surface of the crank piece, and an other end of which extends in a direction crossing the slot so as to reach the slot,
    wherein
    the width of the slot is expanded when a tip of an expanding tool screwed into the screw-thread hole abuts against an inner surface of the slot.

3. The crankshaft of claim 2, wherein
    when the shaft portion is being fit in the fitting hole of the crank piece by the predetermined "interference", the expanding tool is removed from the screw-thread hole.

4. The crankshaft of claim 1, further comprising:
    a key interposed between the fitting hole of the crank piece and the shaft portion, and extending along an axial direction of the shaft portion.

5. The crankshaft of claim 1, wherein
    a run-off portion parting from the outer circumferential surface of the shaft portion is formed in a part of the inner circumferential surface of the fitting hole of the crank piece.

6. The crankshaft of claim 1, wherein
    a run-off portion parting from the inner circumferential surface of the fitting hole of the crank piece is formed in a part of the outer circumferential surface of the shaft portion.

7. A rotary compressor comprising:
    a cylindrical airtight container;
        a compressor mechanism which compresses a coolant inside the airtight container; and
    a motor including a stator fixed to an inner circumferential surface of the airtight container and a rotor surrounded by the stator, and driving the compressor mechanism inside the airtight container,
    the compressor mechanism comprising:
    the crankshaft of claim 1, coupled with the rotor of the motor and to rotate while following the rotor, a plurality of coolant compressing units arranged along an axial direction of the airtight container with intervals therebetween, each including a cylinder chamber in which the crank portion of the crankshaft is accommodated, and an intermediate partition plate interposed between each adjacent pair of the plurality of coolant compressing units along the axial direction of the airtight container.

8. The rotary compressor of claim 7, wherein the crankshaft comprises a plurality of crank portions adjacent to each other along the axial direction of the shaft portion, and the intermediate partition plate comprises a bearing hole which rotatably supports the crankshaft between the plurality of crank portions, and at least one of the plurality of crank portions is formed from the crank piece.

9. A refrigeration-cycle device comprising: a circulation circuit in which a coolant is circulated, and to which a radiator, an expansion device and a heat sink are connected; and the rotary compressor of claim 7, connected to the circulation circuit between the radiator and the heat sink.

10. A crankshaft comprising:

a shaft portion comprising a straight axial line; and at least one crank portion provided in the shaft portion so as to be eccentric to the axial line of the shaft portion, the at least one crank portion being formed from a crank piece, which is an element separate from the shaft portion, and the crank piece comprising:

a fitting hole in which the shaft portion is inserted, a slit-like slot one end of which is opened in an inner circumferential surface of the fitting hole, and an other end of which extends along a diametric direction of the fitting hole so as to be closed inside the crank piece, and is opened in both end surfaces of the crank piece, and a fastener which narrows a width of the slot.

11. The crankshaft of claim 10, wherein the shaft portion is inserted in the fitting hole of the crank piece in a state of "clearance fit".

12. The crankshaft of claim 10, further comprising:

a key interposed between the fitting hole of the crank piece and the shaft portion, and extending along an axial direction of the shaft portion.

13. A method of assembling a crankshaft comprising a shaft portion comprising a straight axial line; and a crank piece formed from an element separate from the shaft portion, and comprising a fitting hole in which the shaft portion is inserted and a slit-like slot one end of which extends along a diametric direction of the fitting hole so as to be opened in an inner circumferential surface of the fitting hole, wherein the crank piece is attached to the shaft portion so as to be eccentric to the axial line, the method comprising:

inserting the shaft portion to the fitting hole of the crank piece in a state of "clearance fit";

screwing a fastener which narrows a width of the slot into the crank peace, thereby deforming the fitting hole to reduce a diameter of the fitting hole in which the shaft portion is inserted, and fastening and fixing the shaft portion in the fitting hole by predetermined "interference".

14. The method of claim 13, wherein when the fastener is removed from the shaft portion, deformation of the fitting hole by the fastener is canceled, thus shifting the crank piece to a state where the crank piece is removable.

* * * * *